US006995798B1

(12) United States Patent
Endo et al.

(10) Patent No.: US 6,995,798 B1
(45) Date of Patent: Feb. 7, 2006

(54) VIEWFINDER CONTROL UNIT AND TELEVISION CAMERA

(75) Inventors: Hidetoshi Endo, Tokyo (JP); Hatsuo Kitada, Tokyo (JP); Masaharu Nishimura, Tokyo (JP)

(73) Assignee: Ikegami Tsushinki Co., Ltd., (JP)

( * ) Notice: Subject to any disclaimer, the term of this patent is extended or adjusted under 35 U.S.C. 154(b) by 0 days.

(21) Appl. No.: 09/548,817

(22) Filed: Apr. 13, 2000

(30) Foreign Application Priority Data

Apr. 16, 1999 (JP) ................................. 11-109647

(51) Int. Cl.
*H04N 5/222* (2006.01)
(52) U.S. Cl. ............................... 348/333.01; 348/14.16
(58) Field of Classification Search ............. 348/14.05, 348/214, 333.06, 333.01, 14.16, 169; 396/374, 396/383
See application file for complete search history.

(56) References Cited

U.S. PATENT DOCUMENTS

| 5,357,870 A | * | 10/1994 | Guichard et al. ............. 108/2 |
| 5,378,973 A | | 1/1995 | Kim |
| 5,430,809 A | * | 7/1995 | Tomitaka .................... 382/173 |
| 5,745,166 A | * | 4/1998 | Rhodes et al. .............. 348/143 |
| 5,949,504 A | | 9/1999 | Kim |
| 6,253,032 B1 | * | 6/2001 | Van Den Herik ........... 396/374 |
| 6,593,956 B1 | * | 7/2003 | Potts et al. .............. 348/14.09 |

FOREIGN PATENT DOCUMENTS

| EP | 0578508 | 1/1994 |
| EP | 0598355 | 5/1994 |
| JP | 5292519 | 4/1992 |
| JP | 6030318 | 7/1992 |
| JP | 8023466 | 7/1994 |
| WO | WO 9302530 | 4/1993 |
| WO | WO 0030347 | 5/2000 |

* cited by examiner

*Primary Examiner*—Wendy R. Garber
*Assistant Examiner*—Timothy J. Henn
(74) *Attorney, Agent, or Firm*—Ostrolenk, Faber, Gerb & Soffen, LLP

(57) ABSTRACT

A viewfinder control unit includes a liquid crystal viewfinder with a hood; a sensor for picking up the face of a cameraman; a pan motor for horizontally rotating the viewfinder; and a tilt motor for varying the angle the viewfinder makes with a horizontal plane to provide the cameraman with an optimum view angle. The viewfinder undergoes tracking control such that it is always trained on the face of a cameraman in response to the panning (left or right swing of a lens) and the tilting (up or down swing of the lens) of the television camera.

15 Claims, 25 Drawing Sheets

VIEWFINDER CONTROL UNIT AND TELEVISION CAMERA

This application is based on Japanese Patent Application No. 11-109647 (1999) filed Apr. 16, 1999, the content of which is incorporated hereinto by reference.

BACKGROUND OF THE INVENTION

1. Field of the Invention

The present invention relates to a viewfinder control unit for visually confirming a picture picked up by a television camera, and to the television camera mounted with the viewfinder control unit.

More particularly, the present invention relates to a viewfinder control unit suitable for controlling a liquid crystal viewfinder integrally mounted on a television camera, and a television camera equipped with the viewfinder control unit.

2. Description of the Related Art

Recently, with the improvement in the characteristics of small-sized liquid crystal display monitors, home video cameras with a built-in image monitor are widely spreading (see, Japanese patent application laid-open No. 8-23466 (1996), for example).

In such a home video camera, the direction of its image monitor changes in conjunction with the movement of the television camera. Thus, a state is always maintained in which the eyes of an operator and the screen of the image monitor face each other.

On the other hand, as for a live camera, typified by a studio television camera, or a portable video camera settled on a tripod, since its image monitor changes the position in connection with the movement of the lens, the camera operator must move his or her face so that it faces the image monitor, or changes the direction of the monitor every time its direction varies.

In addition, since the mounted position and display angle of the image monitor are not always settled in optimum states for the television camera operator to watch, the operator must turn the image monitor manually as needed.

When it is equipped with conventional CRT monitor, even in such a television camera, the problem of hindering viewing every time panning or tilting is made seldom arises. However, using a liquid crystal display as its image monitor presents a problem of requiring more accurate angle adjustment from time to time, which is very tedious. This is because, although the visual characteristics of the liquid crystal display are considerably improved at present, its image quality sharply degrades when images to be monitored deviate from the normal position by more tan certain angle, and hence it cannot achieve its function as a monitor.

In other words, it is desired, every time the direction of the television camera lens is changed by panning and tilting, that the angle of the image monitor be varied so that the image monitor always faces the eyes of the camera operator.

On the other hand, although various techniques are known that detect a particular form or color of a subject to automatically trace its movement (see, Japanese patent application laid-open No. 6-30318 (1994), for example), a technique is not yet known that always trains the image monitor of a television camera on the face of the camera operator. In particular, because panning or tilting or changing the position of a television camera (in the vertical direction) is sometimes made even for a stationary subject (see, FIGS. 10A and 10B), the conventional tracking techniques to a subject cannot be applied to the television camera viewfinder without change.

SUMMARY OF THE INVENTION

The present invention is implemented to solve the foregoing problem. It is therefore an object of the present invention to provide a viewfinder control unit and a television camera capable of always training its viewfinder on the face of a camera operator in conjunction with the panning and tilting of the television camera.

In the first aspect of the present invention, there is provided a viewfinder control unit for controlling a viewfinder for showing an image output from a television camera, the viewfinder control unit comprising:

detecting means for detecting a particular color portion of a television camera operator; and driving means for training the viewfinder on a face of the television camera operator in response to a detection output from the detecting means.

Here, the detecting means may comprise a miniature camera for sensor application attached to the viewfinder, and may detect the particular color portion of the television camera operator from an output of the miniature camera for sensor application.

The detecting means may detect a flesh color portion on the face of the television camera operator as the particular color portion.

The viewfinder may consist of a liquid crystal display.

The miniature camera for sensor application may be rotatably attached to the viewfinder to make panning and/or tilting possible for capturing an accessory worn on the television camera operator.

The accessory to be captured by the miniature camera for sensor application may consist of a weakly luminous object worn on the television camera operator.

The viewfinder control unit may further comprise:

storing means for storing information on a preset position of the viewfinder; and preset control means for returning the viewfinder to the preset position in accordance with the information on the preset position stored in the storing means.

The miniature camera for sensor application may be used as an image pickup device of a videophone, and the viewfinder may be used as a display unit of the videophone.

A television camera may comprise the viewfinder control unit such that the viewfinder is always trained on the face of the television camera operator independently of panning and/or tilting of the television camera.

In the second aspect of the present invention, there is provided a viewfinder control unit attached to a television camera, the viewfinder control unit comprising:

detecting means for detecting a particular color portion of a television camera operator;

calculation means for calculating a central position of the particular color portion; and driving means for driving a motor for panning and/or tilting the viewfinder in response to the central position calculated.

Here, the detecting means may comprise a miniature camera for sensor application attached to the viewfinder, and may detect the particular color portion of the television camera operator from an output of the miniature camera for sensor application.

The detecting means may detect a flesh color portion on the face of the television camera operator as the particular color portion.

The viewfinder may consist of a liquid crystal display.

The miniature camera for sensor application may be rotatably attached to the viewfinder to make panning and/or tilting possible for capturing an accessory worn on the television camera operator.

The accessory to be captured by the miniature camera for sensor application may consist of a weakly luminous object worn on the television camera operator.

The viewfinder control unit may further comprise:
storing means for storing information on a preset position of the viewfinder; and
preset control means for returning the viewfinder to the preset position in accordance with the information on the preset position stored in the storing means.

The miniature camera for sensor application may be used as an image pickup device of a videophone, and the viewfinder may be used as a display unit of the videophone.

A television camera may comprise the viewfinder control unit such that the viewfinder is always trained on the face of the television camera operator independently of panning and/or tilting of the television camera.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The invention will now be described with reference to the accompanying drawings.

Figure 1:
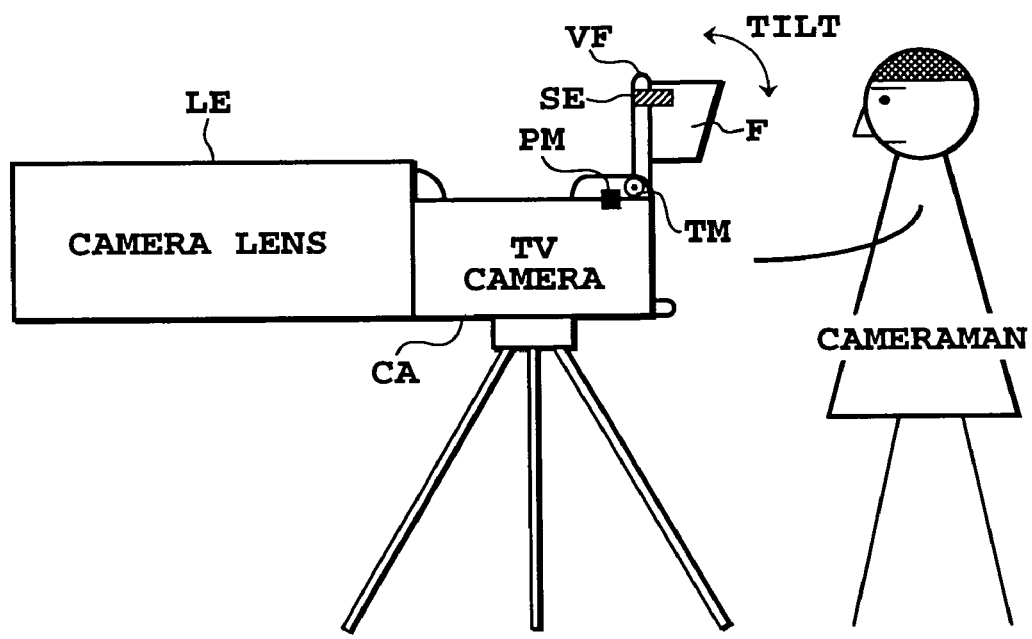
FIG. 1 is a schematic diagram illustrating an overall concept of a viewfinder in accordance with the present invention.
Figure 2:
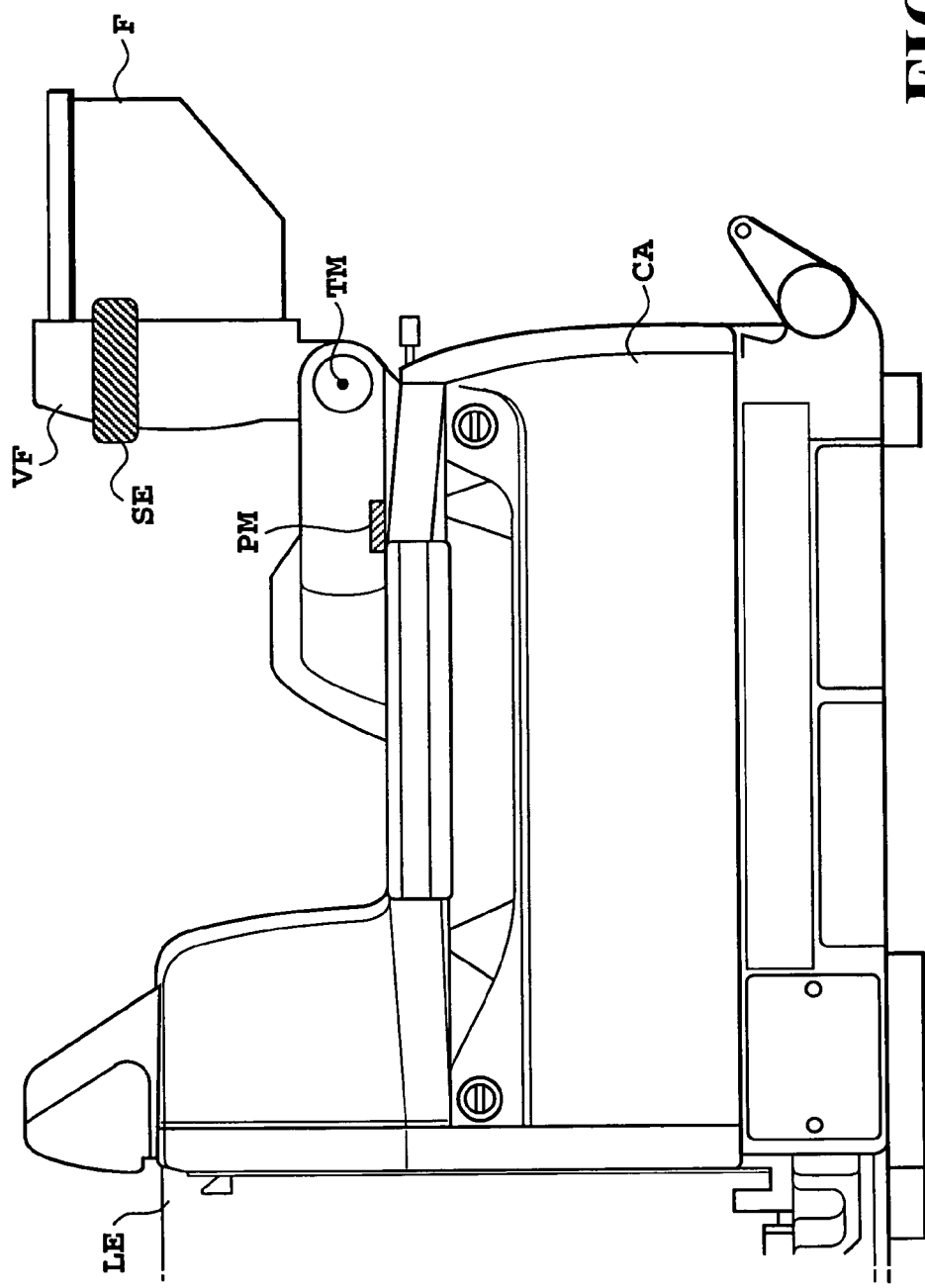
FIG. 2 is an enlarged diagram showing the viewfinder VF as shown in FIG. 1 with its ancillary components.

FIG. 1 is a diagram illustrating an overall concept of a viewfinder in accordance with the present invention, and FIG. 2 is an enlarged diagram showing the viewfinder VF and its ancillary components as shown in FIG. 1. In these figures, the reference symbol CA designates a television camera; LE designates a camera lens; VF designates a liquid crystal viewfinder with a hood F; and SE designates a sensor (miniature television camera) for picking up the face of a cameraman. The reference symbol PM designates a pan motor for horizontally rotating the viewfinder VF; and TM designates a tilt motor for varying the angle the viewfinder VF makes with a horizontal plane to provide the cameraman with an optimum view angle.

With the foregoing arrangement, the viewfinder VF carries out tracking such that it is always trained on the face of a cameraman in connection with the pan (left or right turn of the lens LE) or tilt (up or down rotation of the lens LE) of the television camera CA.

Next, an electric configuration for implementing such an operation of the viewfinder VF will be described.

Embodiment 1

Figure 3:
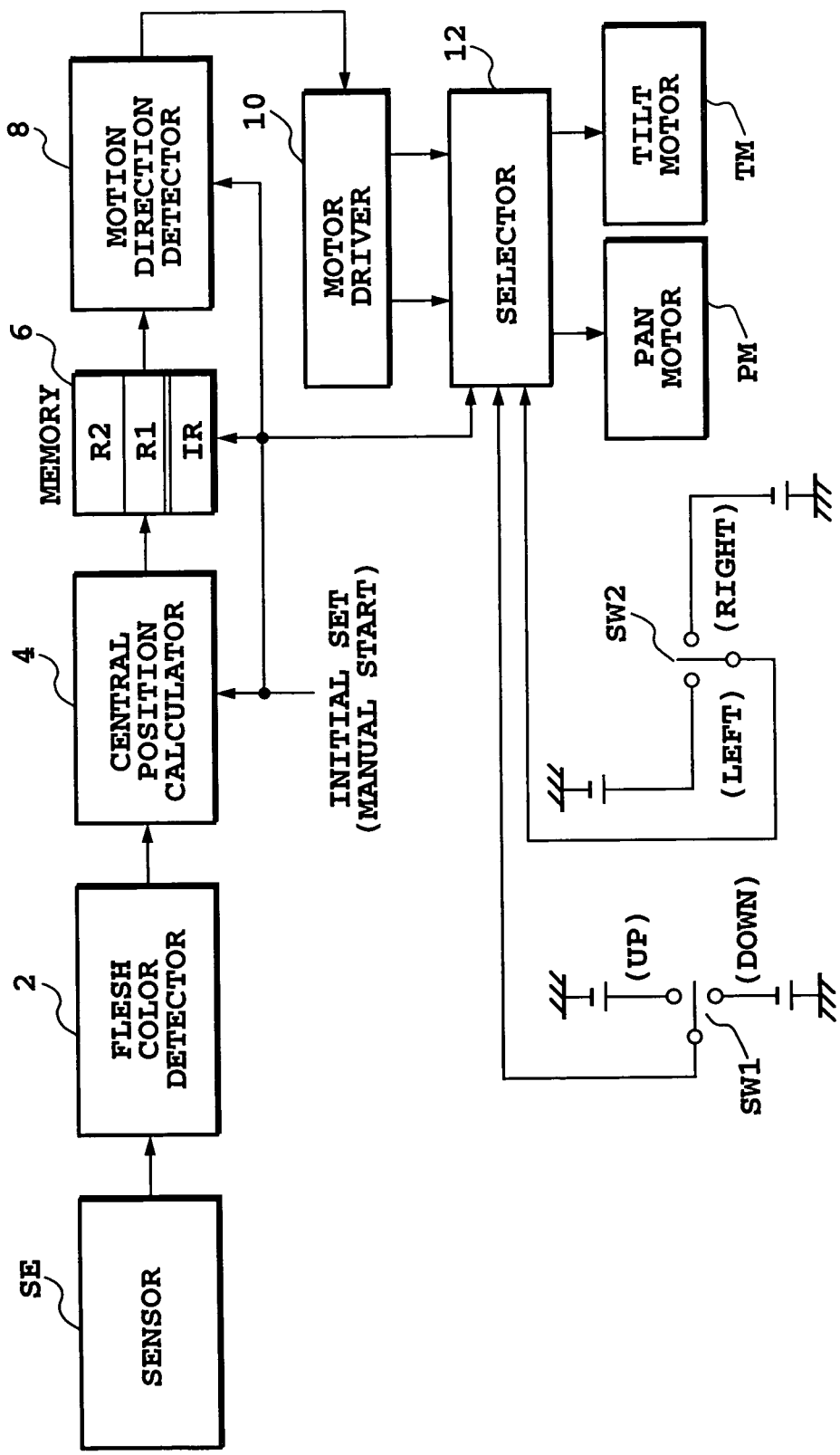
FIG. 3 is a block diagram showing a viewfinder control circuit in an embodiment 1 in accordance with the present invention.

FIG. 3 shows an example of a viewfinder control circuit. In this figure, the reference symbol SE designates the sensor as shown in FIGS. 1 and 2, which picks up the face of the cameraman. The reference numeral 2 designates a flesh color detector that outputs a high level signal when it detects a flesh color portion of the cameraman in response to the R, G and B signals supplied from the sensor SE (the detail of the flesh color detector will be described later with reference to FIG. 4). The reference numeral 4 designates a central position calculator that calculates the central position of the face of the cameraman from the high level signal supplied from the flesh color detector 2 (the detail of the central position calculator will be described later with reference to FIGS. 5 and 6). The reference numeral 6 designates a memory including three stacks IR, R1 and R2 (the detail of the memory will be described later). The reference numeral 8 designates a motion direction detector for generating in response to the values stored in the memory 6 a control signal for having the viewfinder VF to carry out pan and tilt (the detail of the motion direction detector will be described later with reference to FIG. 7). The reference numeral 10 designates a motor driver for driving the pan motor PM and tilt motor TM. The reference symbols SW1 and SW2 each designate a manual switch for manually changing the position of the viewfinder VF. The reference numeral 12 designates a selector for causing the motors PM and TM to rotate in response to the operation of the manual switches SW1 and SW2 (right, left, up or down) giving the highest priority to the switch operation.

Although the operator moves his or her hand off the manual switches SW1 and SW2 in the OFF state, the automatic tracking of the apparatus does not start until the initial setting is made again. In other words, the selector 12 selects the output of the motor driver 10 when an initial set switch (not shown) is turned on again.

Next, the operation of the flesh color detector 2 will be described in more detail with reference to FIG. 4.

Figure 4:
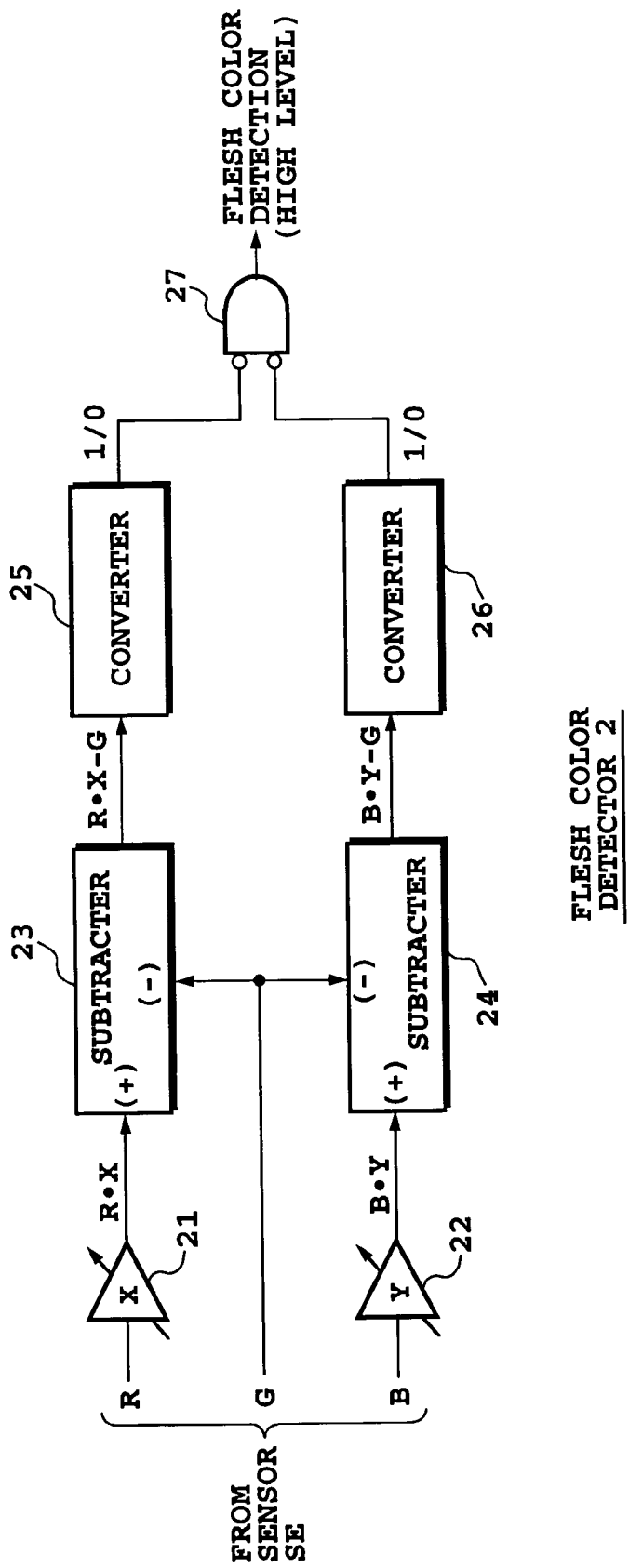
FIG. 4 is a circuit diagram showing a flesh color detector 2 as shown in FIG. 2 in detail.
Figure 5:
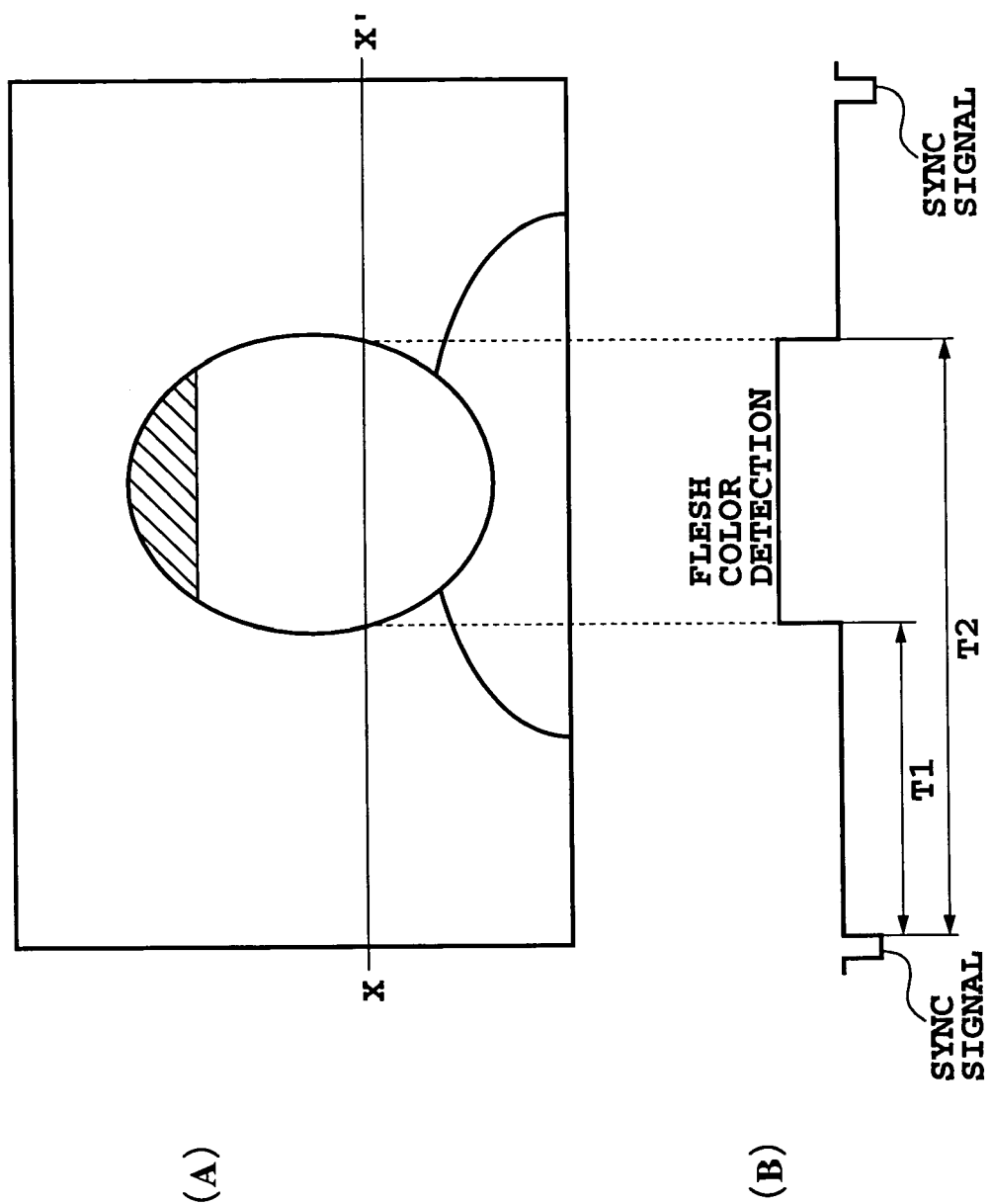
FIG. 5 is a diagram illustrating detection of a central position of a face in the embodiment 1.

FIG. 4 shows a circuit configuration of the flesh color detector 2 in detail. In this figure, reference symbols R, G and B designate the R, G and B signals supplied from the sensor SE, respectively. The reference numeral 21 designates an amplifier with an amplification factor X (X is externally settable); 22 designates an amplifier with an amplification factor Y (Y is externally settable); and 23 and 24 each designate a subtracter. The reference numerals 25 and 26 each designate a converter for generating a logic "0" signal when the signal level supplied from the subtracter 23 or 24 is zero, and a logic "1" signal in the remaining cases. The reference numeral 27 designates an invert-AND circuit for outputting a high level signal when the sensor SE detects the flesh color.

Next, the operation principle of the circuit of FIG. 4 will be described.

To determine the hue using the sensor SE, it is necessary to determine the ratios between the levels of the R, G and B signals. Assume that the ratios between the levels of the R, G and B signals of the face of the cameraman are:

$$R:G=1:X$$

$$B:G=1:Y \quad (1)$$

then, $$G=R \cdot X$$

$$G=B \cdot Y \quad (2)$$

therefore, $$R \cdot X - G = 0$$

$$B \cdot Y - G = 0 \quad (3)$$

Thus, assuming the following expression for a particular color (flesh color, here):

$$R:G:B=a:b:c \quad (4)$$

$$G=(b/a) \cdot R$$

$$G=(b/c) \cdot B \quad (5)$$

then, expression (3) will hold when setting X and Y as follows:

$$X=b/a$$

$$Y=b/c \quad (6)$$

In other words, the R, G and B signals representing the particular color (flesh color, here) can be detected by presetting X and Y as equation (6) above.

Applying this detection principle to an actual circuit leads to the flesh color detector 2. Specifically, since the outputs of the subtracters 23 and 24 become (R·X−G) and (B·Y−G) at the time equation (3) is satisfied, the AND circuit 27 outputs a high level flesh color detection signal at that time. When the high level flesh color detection signal is output, R:G:B=a:b:c holds.

Incidentally, to provide variations (tolerance) of some extent to the value representing the hue of the flesh color, it is possible to install window comparators as disclosed in FIG. 1 of Japanese patent application laid-open No. 5-292519 (1993) filed by the assignee of the present application. In addition, the hue of the flesh color can be set individually taking account of the differences of respective cameramen.

Returning to FIG. 3, the operation of the central position calculator 4 will be described.

Assume that the face of the cameraman as shown in FIG. 5(A) is acquired by the sensor SE. Then, the flesh color detector 2 outputs a signal that takes a high level at a portion of the face on a scanning line X–X' as shown in FIG. 5(B). The middle point of the high level section is given by $(T_1+T_2)/2$ with respect to a scanning start point (horizontal sync signal), where $T_1$ and $T_2$ are time periods from the scanning start point.

Figure 6:
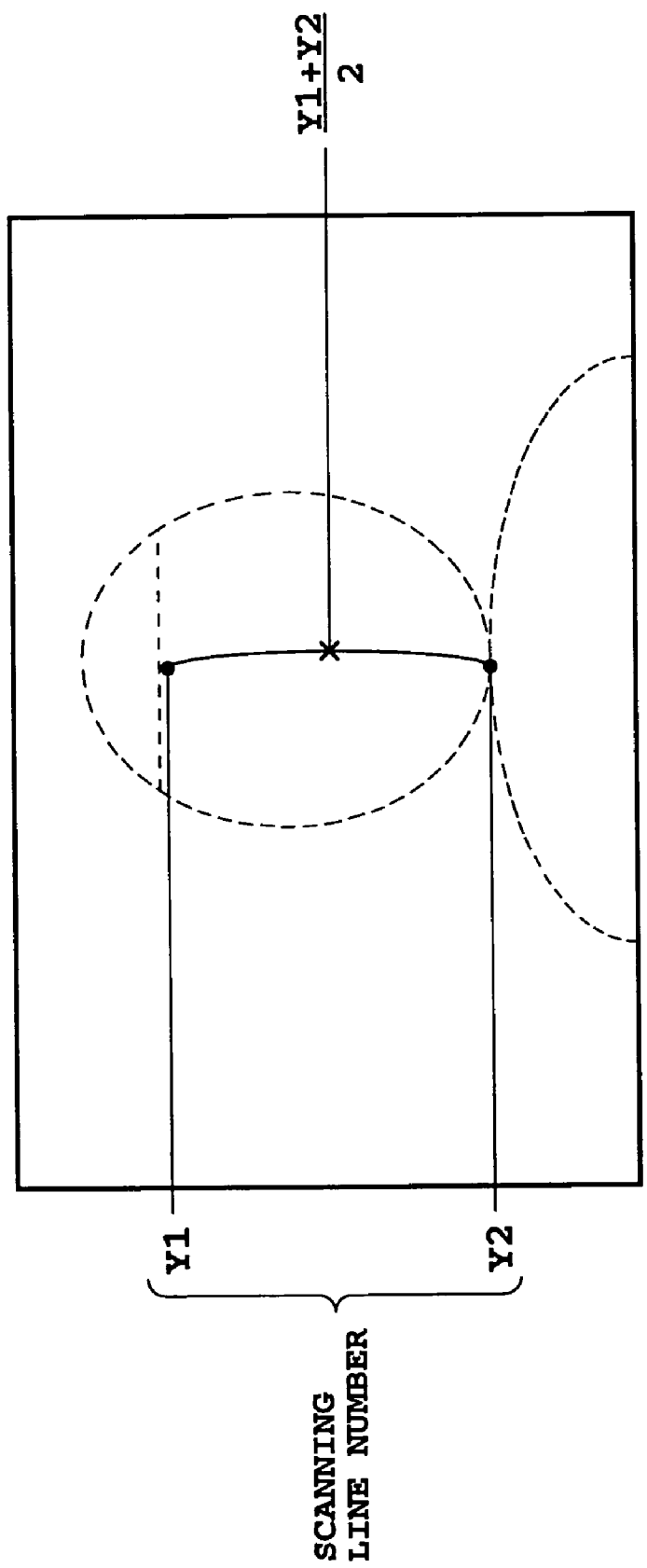
FIG. 6 is a diagram illustrating the detection of the central position of the face in the embodiment 1.

Obtaining such middle points for all the scanning lines passing through the face, and connecting them with solid lines will give a locus as shown in FIG. 6. Then, the middle point of the locus as shown in FIG. 6 can be obtained by $(Y_1+Y_2)/2$, where $Y_1$ and $Y_2$ are scanning line numbers.

The middle point of the locus thus obtained is considered to be the center of the face. Thus, in this field, the point x as shown in FIG. 6 is decided as the center of the face, and the position information is stored in the next stage of the memory 6. More specifically, the face center coordinates of the current field are written into the stack R1 of the memory 6 after shifting the face center coordinates (the face center coordinates of the previous field) having been stored in the stack R1 to the stack R2.

Although the foregoing center coordinate calculation method is not an accurate calculation process, it presents no problem in an actual operation because the face of the cameraman is close to the viewfinder VF.

Figure 7:
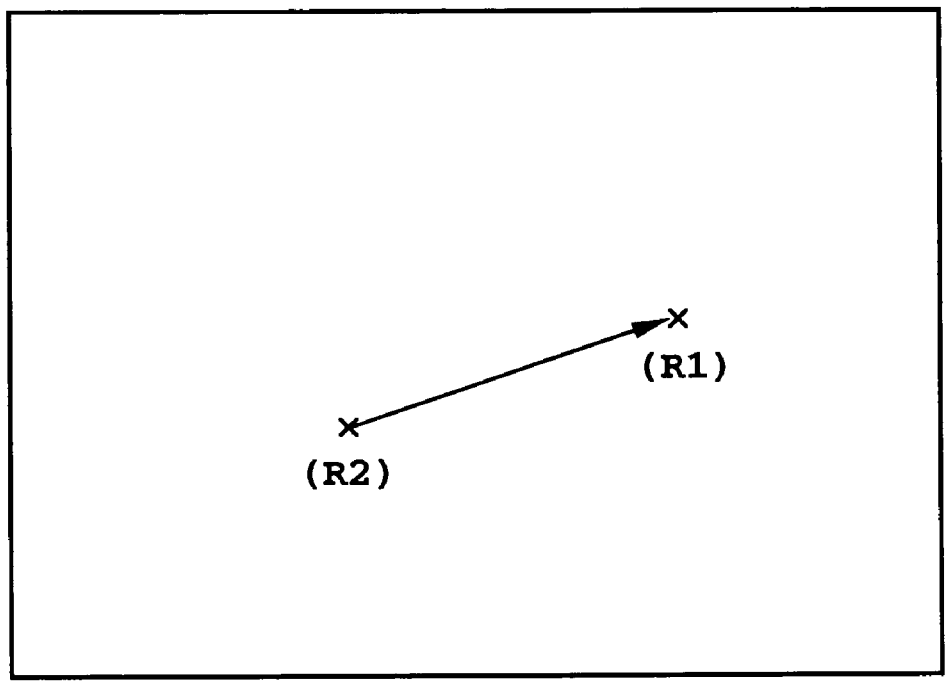
FIG. 7 is a diagram illustrating motion direction detection.

FIG. 7 is a schematic diagram illustrating the current field center (R1) and previous field center (R2) stored in the stack R1 and stack R2 of the memory 6. The arrow in FIG. 7 represents a motion vector, and the motion direction detector 8 supplies a motor control signal corresponding to the motion vector to the motor driver 10. Although a slight movement by an amount of one scanning line will arise because of the interlaced scanning between an odd field and even field even in a static state involving no motion, the motion direction detector 8 disregards the movement as a negligible error.

Thus, the motor driver 10 has the pan motor PM and tilt motor TM rotate (see, FIGS. 1 and 2), thereby carrying out the viewfinder drive that automatically tracks the face of the cameraman.

To start the viewfinder drive, that is, to start the automatic tracking of the face, it is necessary for the cameraman to depress the initial setting switch (not shown) while he or she looks at the front of the liquid crystal display screen of the viewfinder VF so that the face center coordinates at the time are written into the stack IR (initial setting register) of the memory 6. Accordingly, an instruction is given in this case in order to halt the operation of the motion direction detector 8. The face center coordinates written in the stack IR are copied into the stack R1 by the time the central position calculation of the next field is carried out. The content stored in the stack IR is held as a point of convergence until it is updated by the next initial setting.

The automatic tracking of the particular color in the present embodiment 1 is only an example, and hence the present invention is not limited to it.

Embodiment 2

Figure 8:
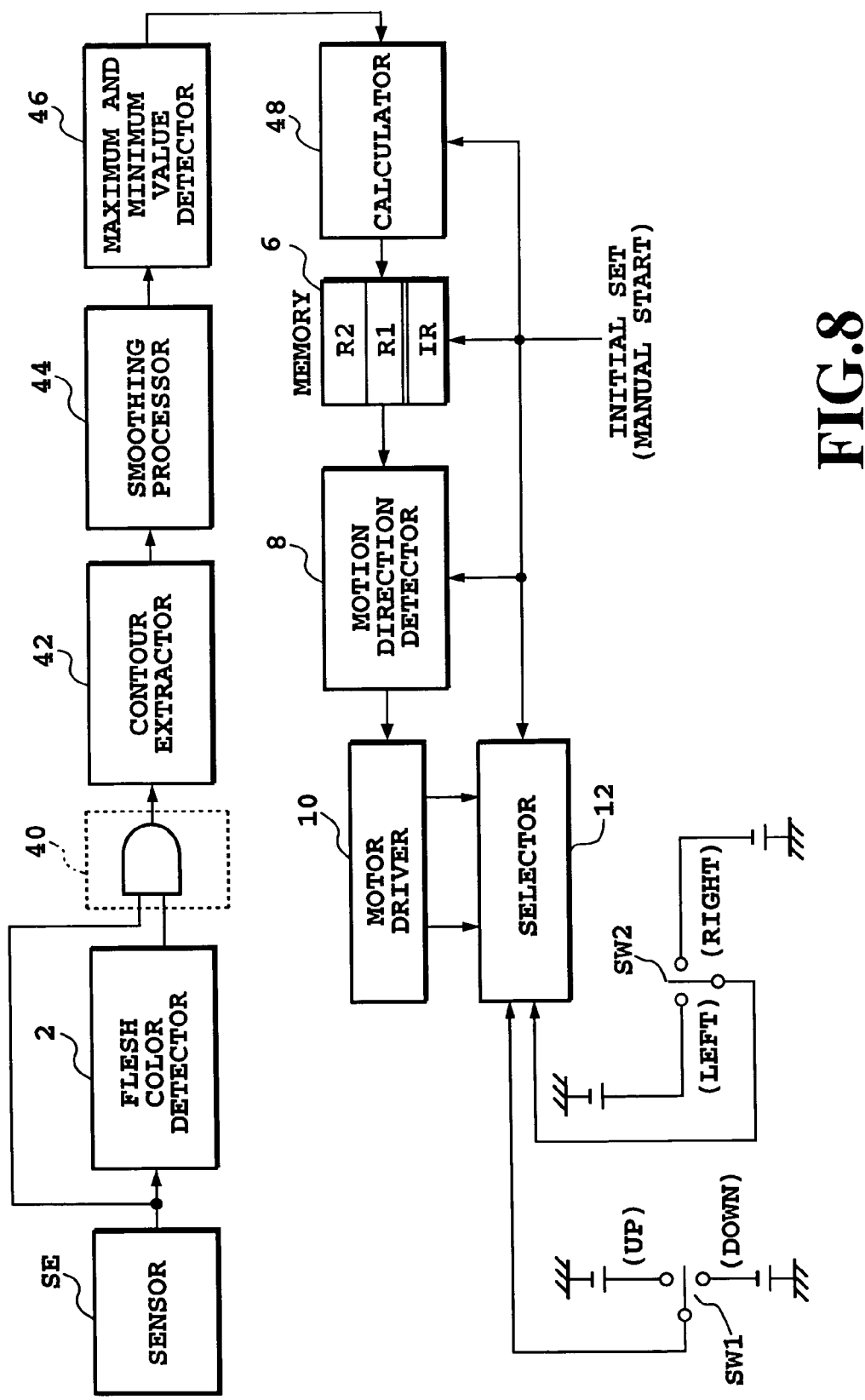
FIG. 8 is a block diagram showing a viewfinder control circuit in an embodiment 2 in accordance with the present invention.

FIG. 8 shows anther viewfinder control circuit, in which the same reference numerals designate the same components as those of FIG. 3. Thus, the description will be omitted here of the same components, the sensor SE, flesh color detector 2, memory 6, motion direction detector 8, motor driver 10, manual switches SW1 and SW2, selector 12, pan motor PM and tilt motor TM.

In FIG. 8, newly added components are an AND circuit 40, a contour extractor 42, a smoothing processor 44, a maximum and minimum value detector 46 and a calculator 48.

Next, their operations will be described.

The AND circuit 40 receives the R, G and B signals from the sensor SE and the (high level) flesh color detection signal from the flesh color detector 2. Accordingly, the contour extractor 42 outputs a contour signal only when the flesh color detector 2 detects the flesh color, in which case the contour of the flesh color portion is obtained. However, since the contour signal includes high frequency components, it is not always a continuous signal. Considering this, the smoothing processor 44 carries out low frequency filtering of the contour signal to form a continuous flesh color area.

Figure 9:
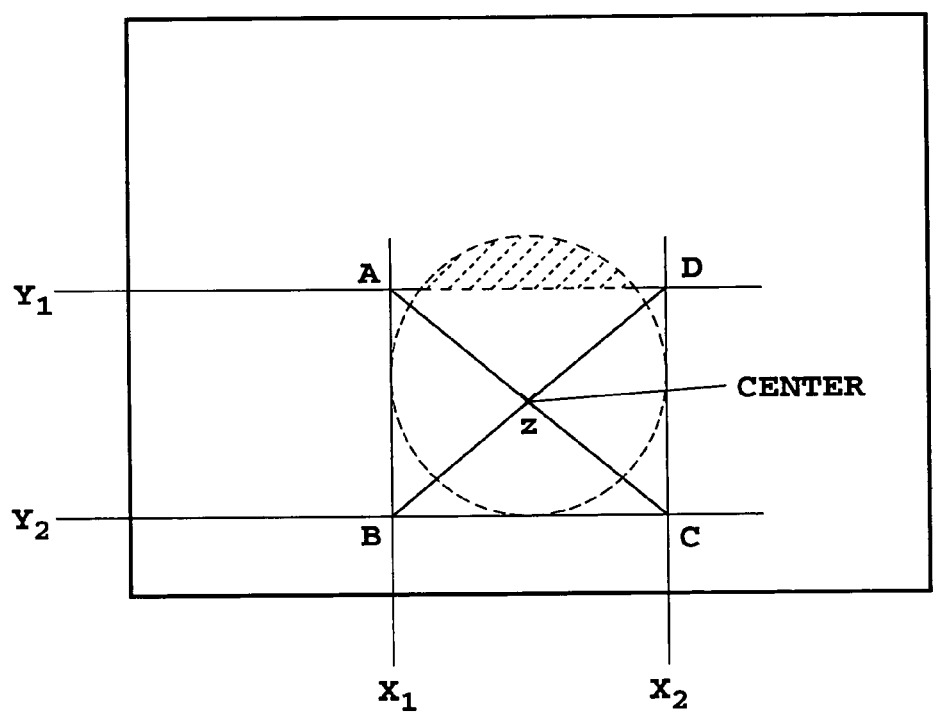
FIG. 9 is a diagram illustrating detection of a central position of a face in the embodiment 2.

The signal representing the continuous flesh color area is supplied to the maximum and minimum value detector 46. In response to the signal, the detector 46 detects minimum value $X_1$ and maximum value $X_2$ in the horizontal direction, and minimum value $Y_1$ and maximum value $Y_2$ in the vertical direction as shown in FIG. 9. Thus, a quadrilateral ABCD including the flesh color area is detected.

In the present embodiment 2, the point of intersection z of the diagonals of the quadrilateral ABCD is considered the central position of the face, so that the calculator 48 obtains the X-coordinate and Y-coordinate of the central position z. As is clear from FIG. 9, the X-coordinate is given by $(X_1+X_2)/2$, and the Y-coordinate is given by $(Y_1+Y_2)/2$.

Figure 10A:
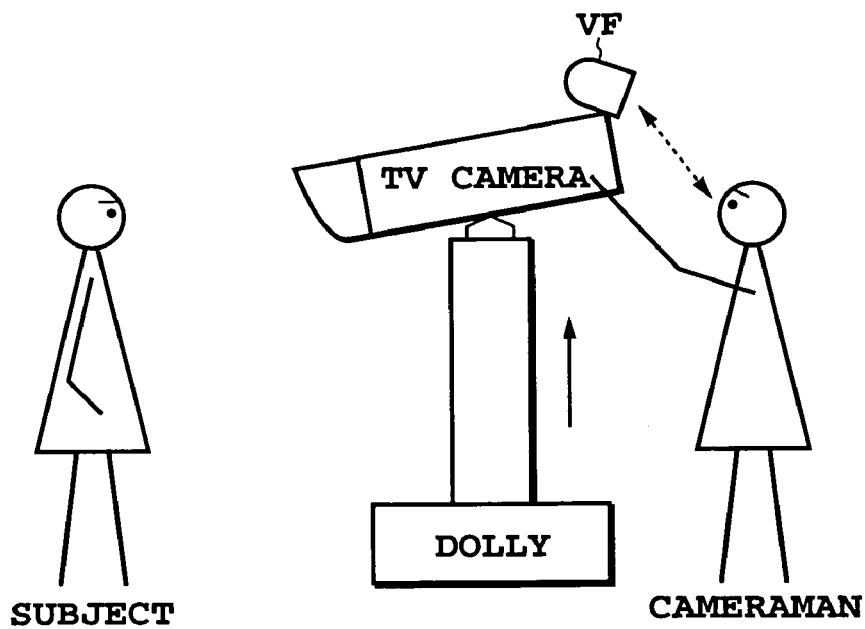
FIGS. 10A and 10B are diagrams each illustrating a tracking state of the viewfinder VF that automatically tracks the face of a cameraman when he or she changes the height of the television camera by operating a dolly.
Figure 10B:
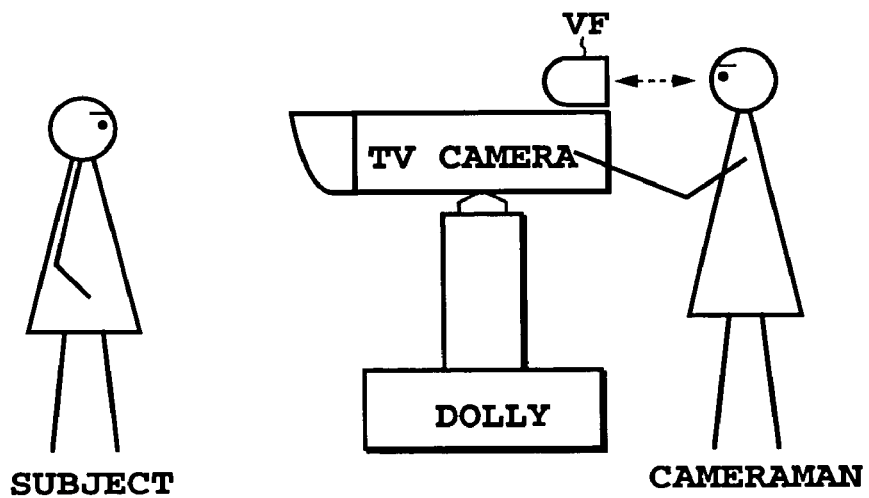

According to the present embodiment 2, changing the height of the television camera by operating the dolly as shown in FIGS. 10A and 10B does not require any adjustment of the direction of the viewfinder which must be carried out manually in a conventional camera, because the viewfinder VF automatically tracks the face of the cameraman.

Embodiment 3

Figure 11:
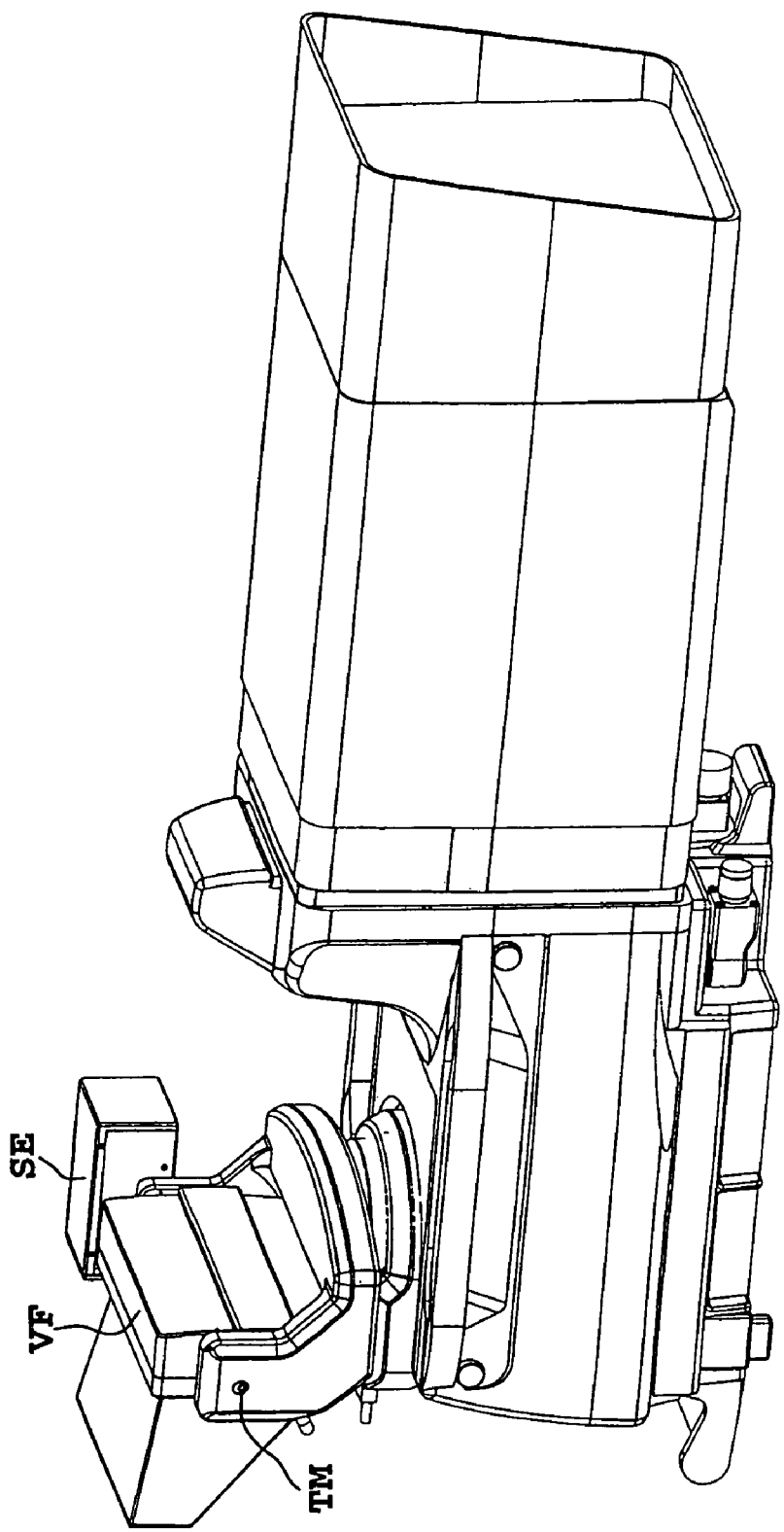
FIG. 11 is a perspective view showing an embodiment 3 in accordance with the present invention.
Figure 12:
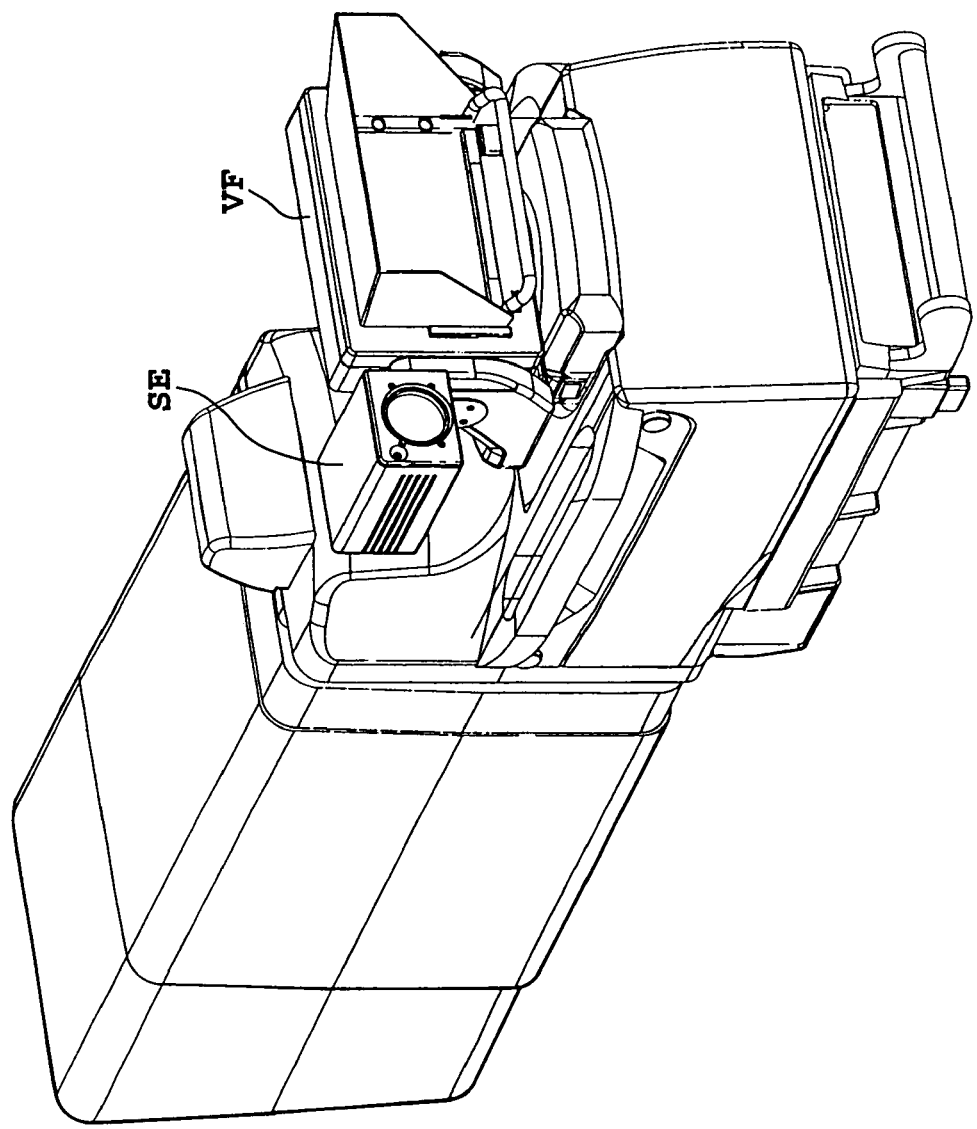
FIG. 12 is another perspective view showing the embodiment 3 in accordance with the present invention.

FIG. 11 shows an embodiment which varies the mounting position of the tilt motor TM. Although the tilt motor TM is mounted on the base of the viewfinder VF in FIG. 2, it is mounted on the opposite side of the sensor SE in FIG. 11. FIG. 12 is a perspective view seen from the liquid crystal display screen side of the viewfinder VF.

Embodiment 4

Figure 13:
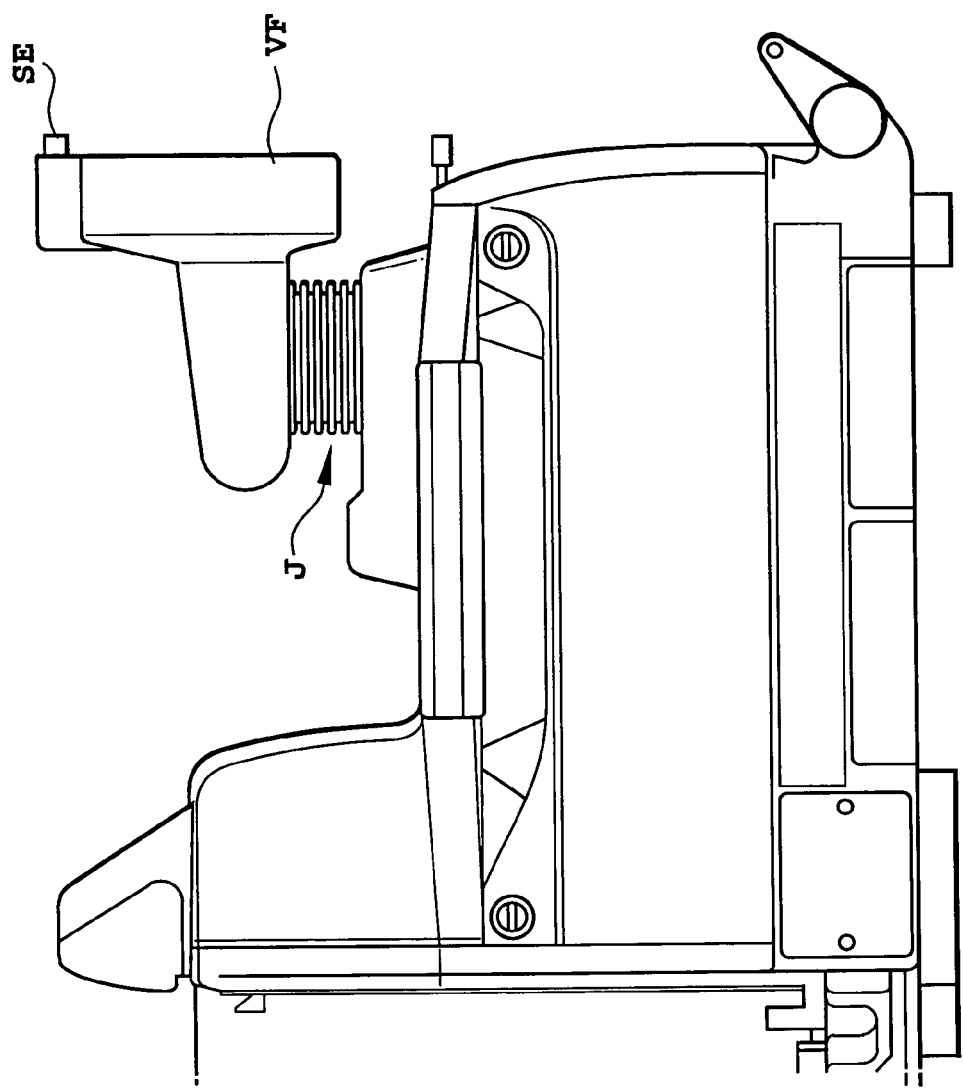
FIG. 13 is a side view of an embodiment 4 in accordance with the present invention.
Figure 14:
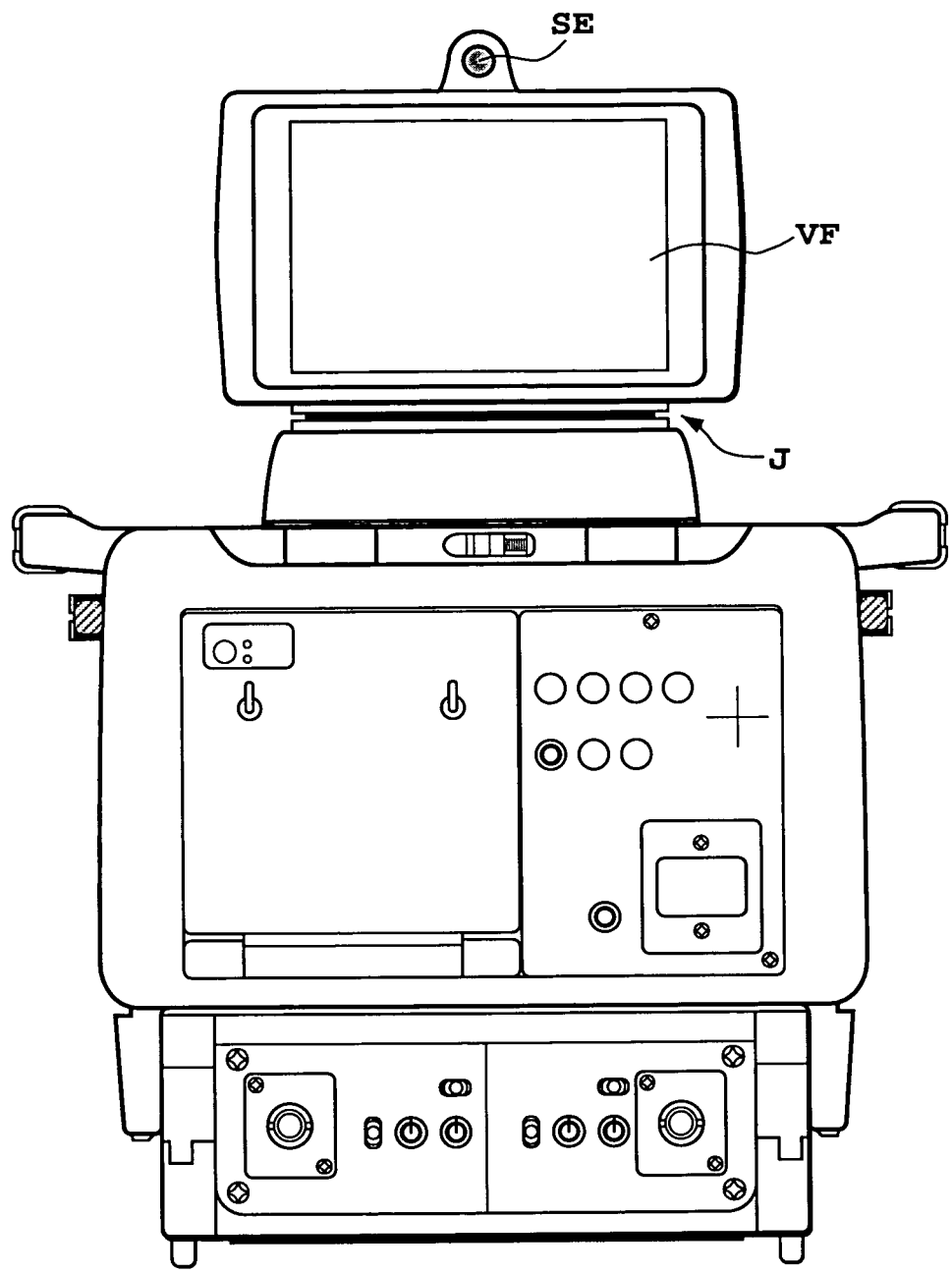
FIG. 14 is a front view of the embodiment 4.

FIG. 13 (side view) and FIG. 14 (front view) show an embodiment in which the sensor SE is mounted on top of the viewfinder VF, and the driving mechanism for panning and tilting the viewfinder VF is installed in a bellows J.

Embodiment 5

Figure 15:
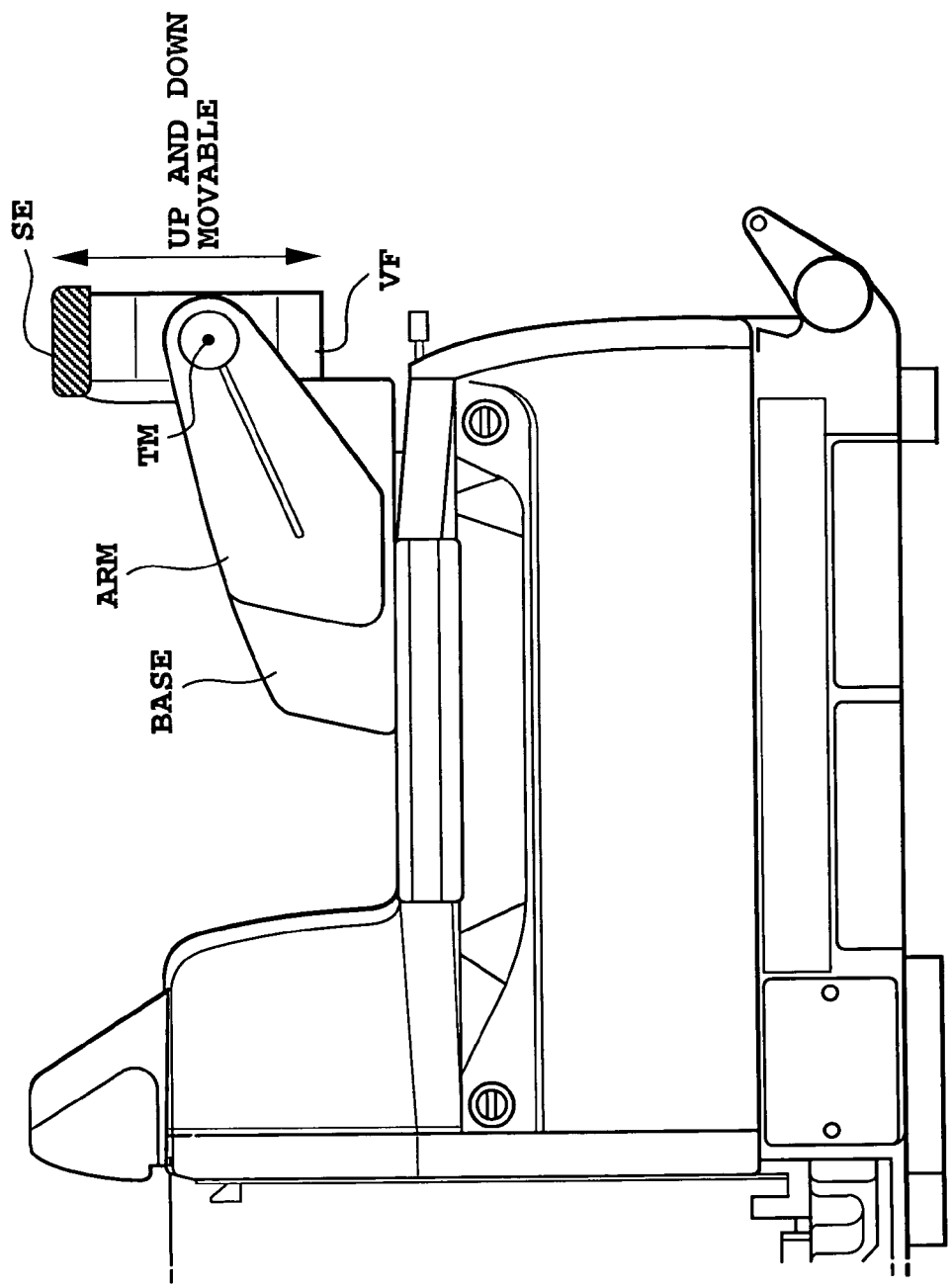
FIG. 15 is a side view of an embodiment 5 in accordance with the present invention.
Figure 16:
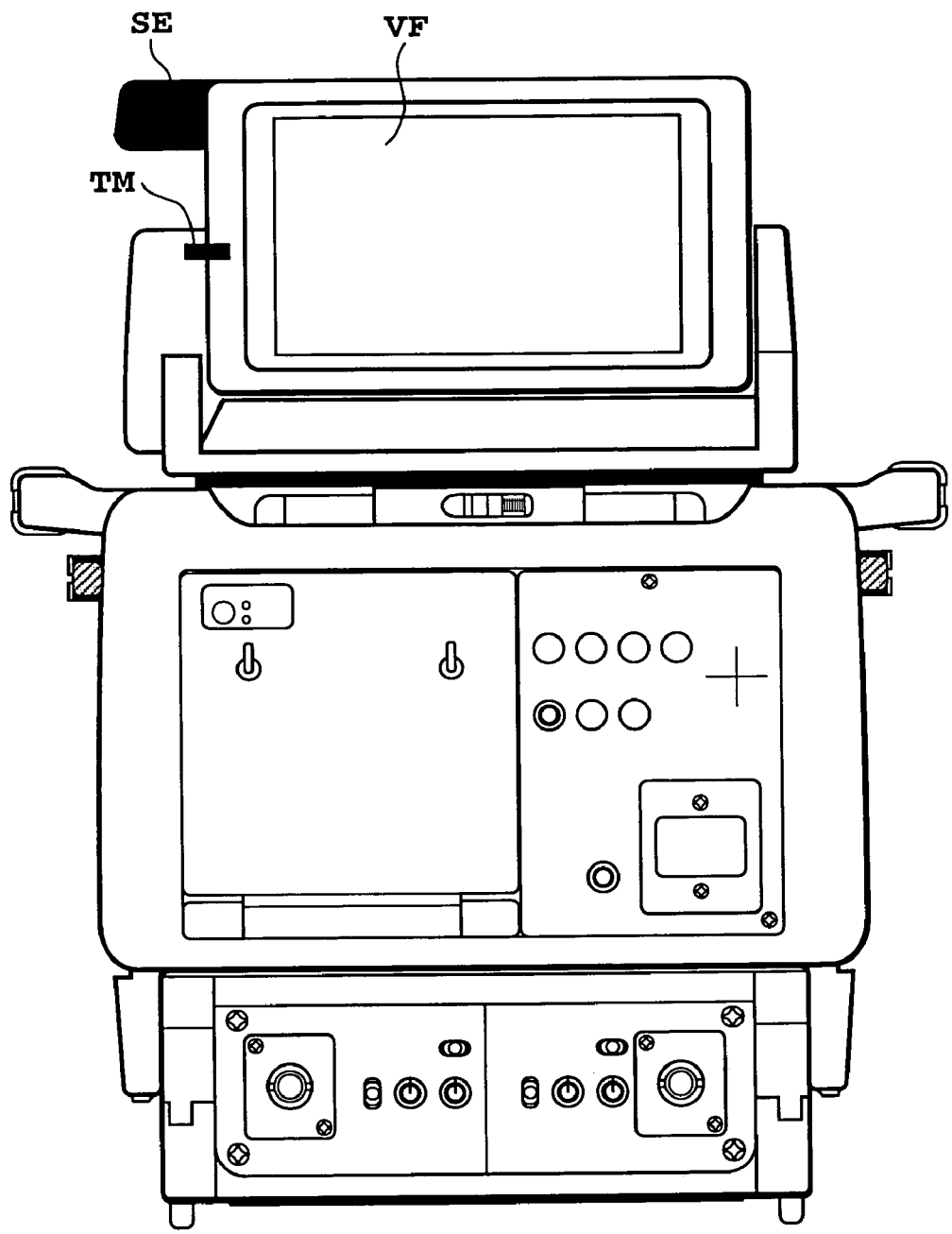
FIG. 16 is a front view of the embodiment 5.

FIG. 15 (side view) and FIG. 16 (front view) show an embodiment in which an arm ARM for supporting the viewfinder VF is provided in such a manner that the viewfinder VF is slidable up and down. Specifically, the arm ARM for supporting the viewfinder VF is slidably mounted on the base BASE in such a manner that it is disposed between the viewfinder VF and the base BASE.

Embodiment 6

The present embodiment 6 enables the sensor (miniature television camera) SE itself to be panned and tilted manually. Specifically, as shown in FIGS. 17A and 17B, it automatically capture a button on the cameraman's chest (see, FIG. 17A) or the top of the cameraman's hat (see, FIG. 17B), for example, rather than the cameraman's face.

Figure 17A:
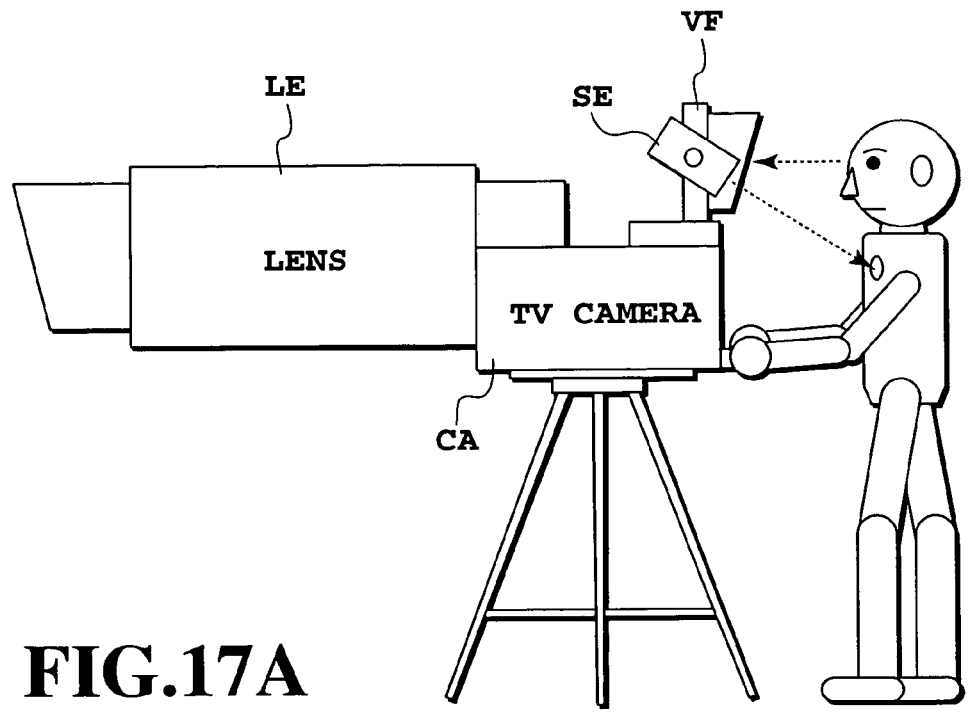
FIGS. 17A and 17B are diagrams each illustrating an operation of an embodiment 6 in accordance with the present invention.
Figure 17B:
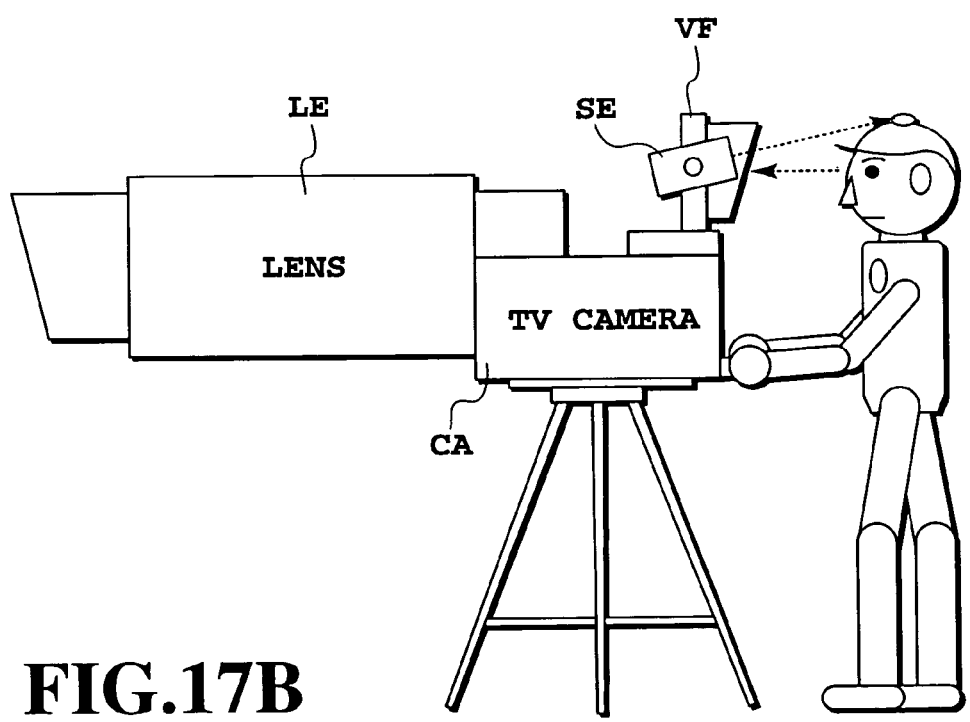
Figure 18:
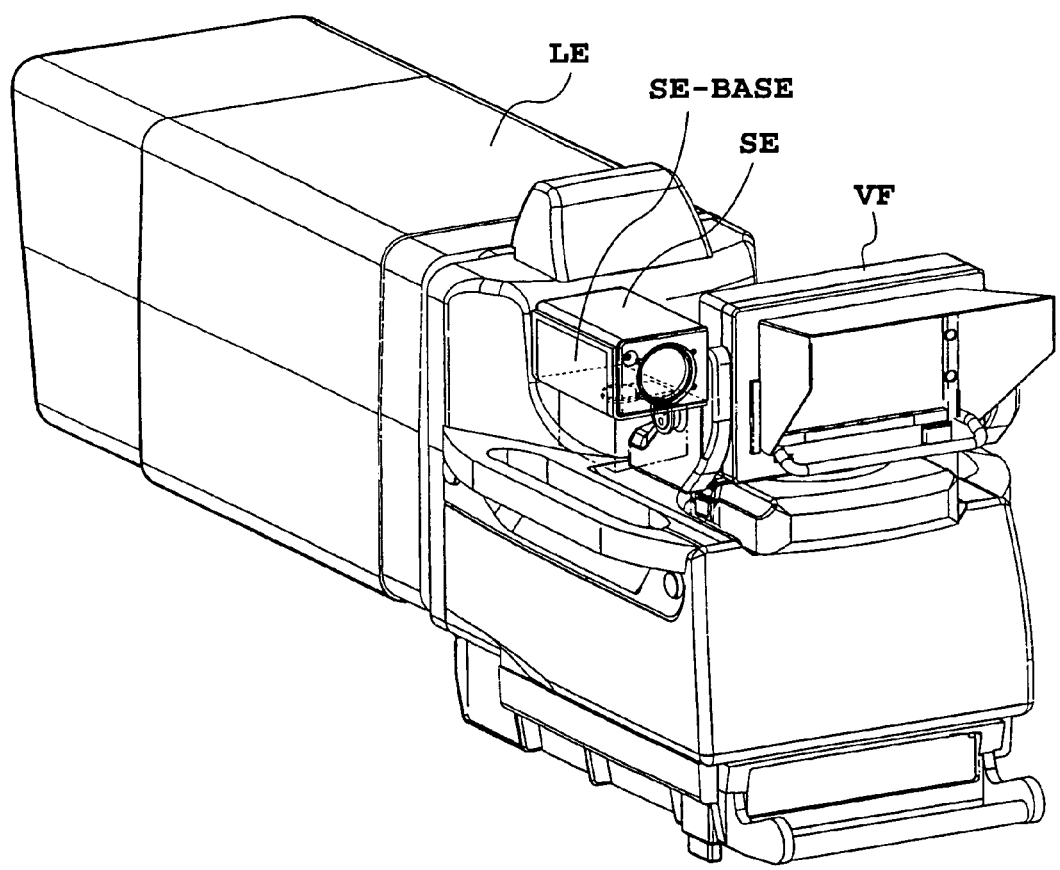
FIG. 18 is a perspective view showing an overall structure of the embodiment 6.
Figure 19:
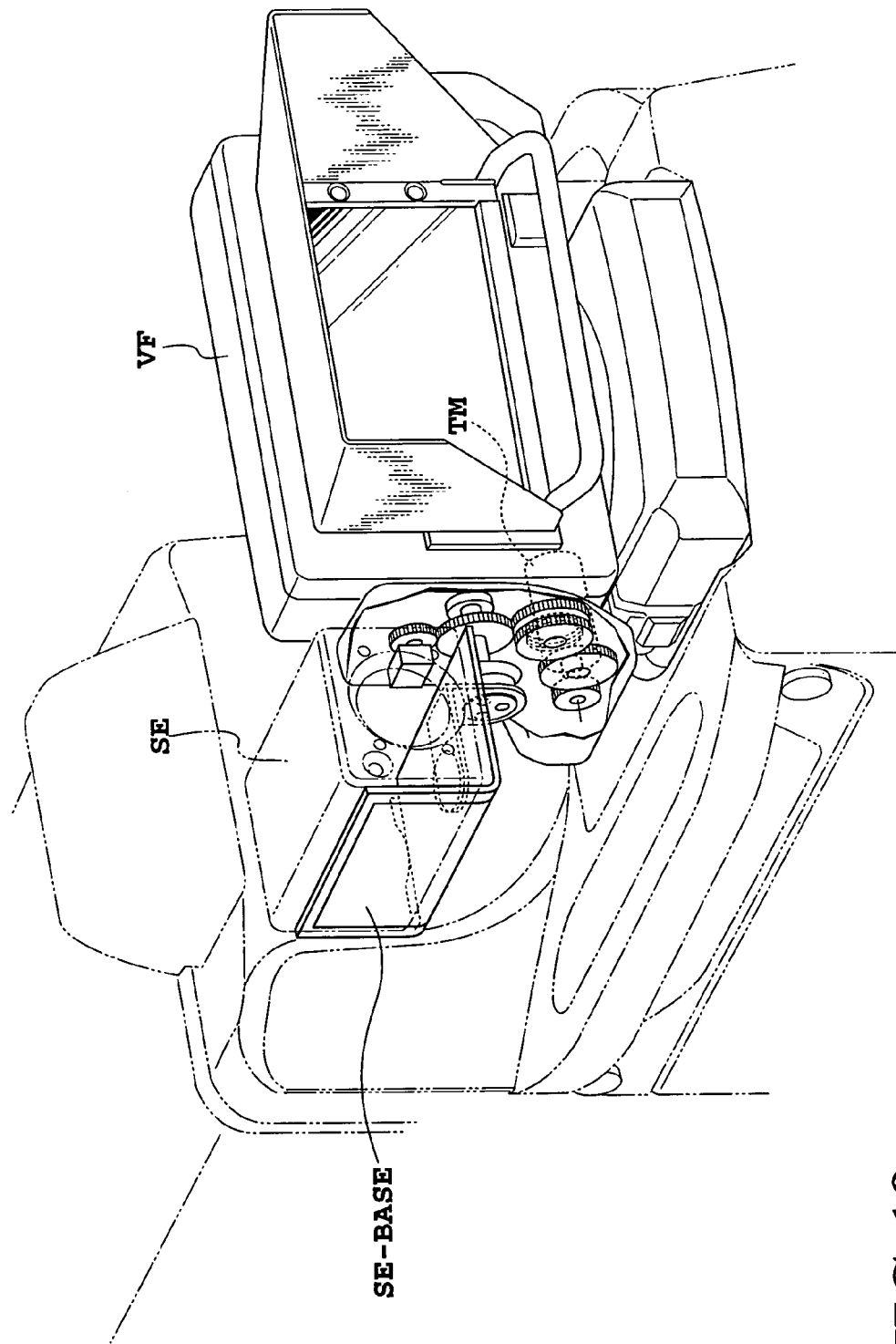
FIG. 19 is an enlarged detail showing a tilting mechanism in the embodiment 6.

FIG. 18 is a perspective view showing an overall structure of the viewfinder VF and sensor (miniature television camera) SE as shown in FIGS. 17A and 17B. As shown in this figure, the sensor (miniature television camera) SE is mounted on a sensor mount member SE-BASE rather than on the viewfinder VF. FIG. 19 is a perspective view showing a mounted state of the camera in more detail, and FIG. 20 is a front view illustrating the relationship between the sensor (miniature television camera) SE and the sensor mount member SE-BASE.

Figure 20:
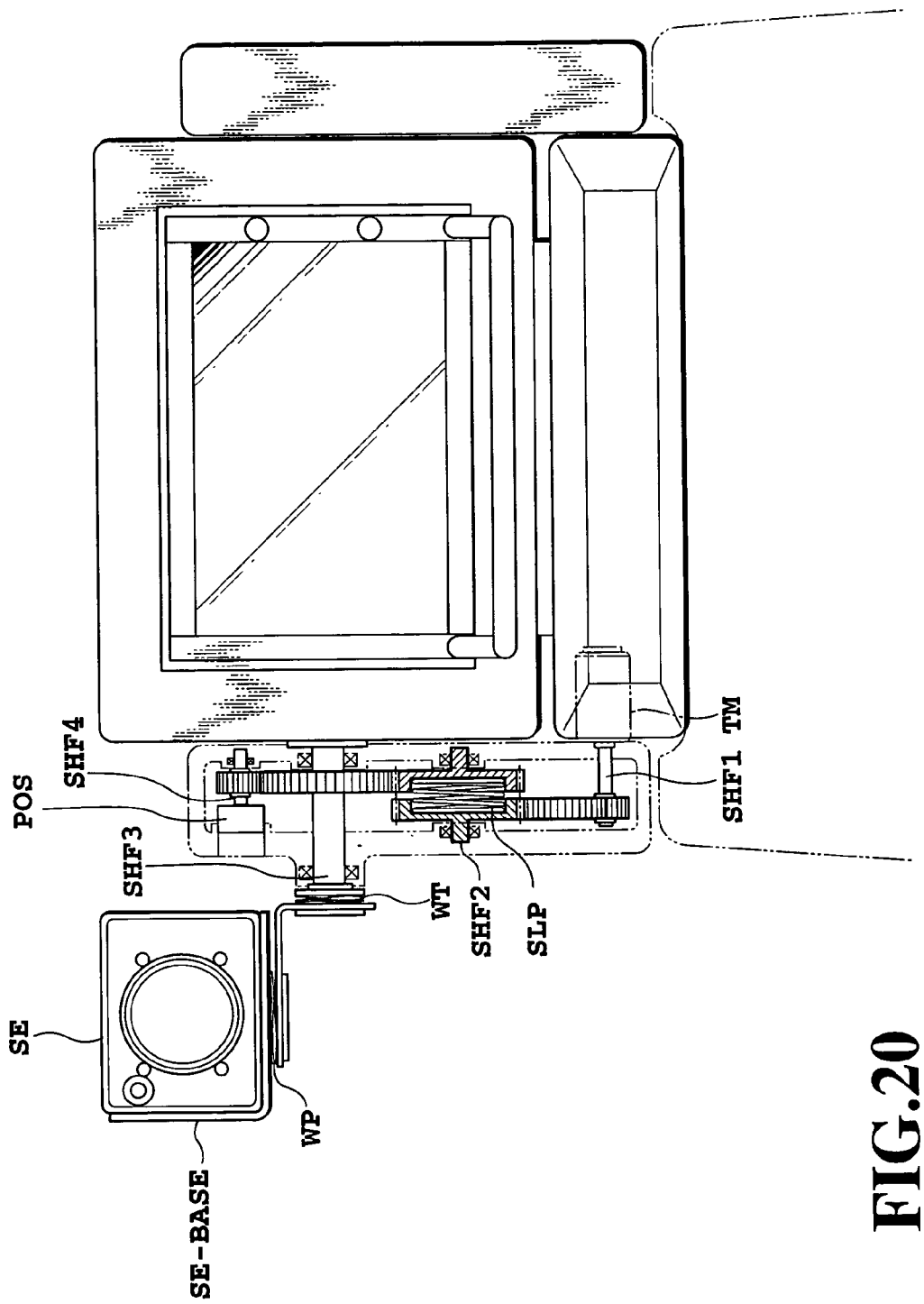
FIG. 20 is a front view showing the tilting mechanism in the embodiment 6 in detail.
Figure 21:
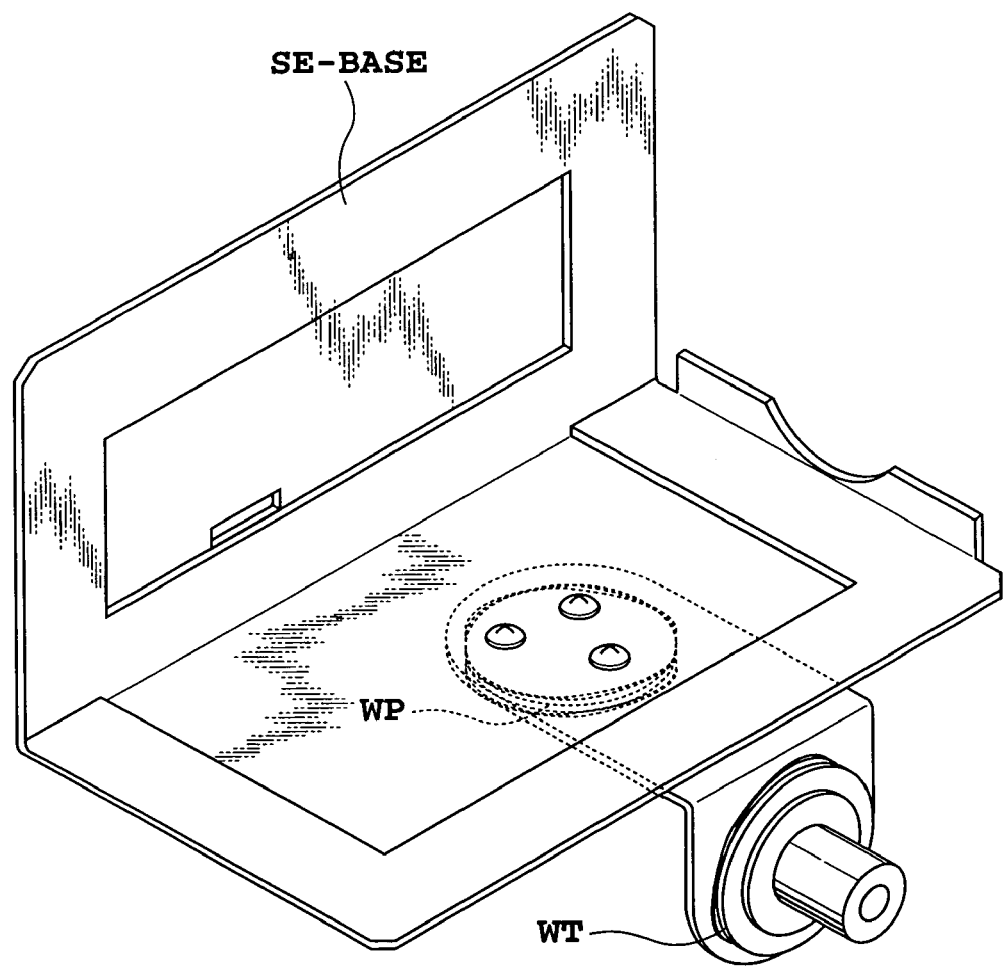
FIG. 21 is an enlarged view showing a sensor mount member SE-BASE in the embodiment 6.

Furthermore, FIG. 21 is an enlarged detail illustrating only the sensor mount member SE-BASE. In FIGS. 21 and 20, the reference symbol WP designates a spring washer for fixing the sensor (miniature television camera) SE manually panned; and WT designates a spring washer for fixing the sensor (miniature television camera) SE manually tilted.

Incidentally, a tilt drive system (tilt motor TM and gear) and a pan drive system (not shown in the drawings) of the viewfinder VF are each provided with a slip member SLP utilizing plane pressure as shown in FIG. 20. This makes it possible to face the viewfinder VF to any desired direction manually without applying undue force to the driving systems because their rotation axes slip smoothly by applying a force beyond a certain level.

Next, the operation of the present embodiment 6 will be described in more detail with reference to FIGS. 17A, 17B–21.

To carry out automatic tracking of the cameraman, the foregoing embodiments 1–5 use the flesh color of the cameraman's face as the target of a specified color to be stored. In contrast with this, the present embodiment 6 utilizes as a target an accessory that moves in conjunction with the cameraman or a mark such as cameraman's wear or hat, which is not placed in front of the viewfinder VF because the direction of the sensor (miniature television camera) SE can be manually changed to the left or right or up or down as shown in FIGS. 17A and 17B. Because the target has a certain positional relationship with the cameraman's face as shown in FIGS. 17A and 17B, presenting the positional relationship as an offset value makes it possible for the sensor (miniature television camera) SE to track an object other than the cameraman's face.

To make the offset setting, the present embodiment 6 fixes the sensor (miniature television camera) SE by means of friction of the spring washers WP and WT (see, FIGS. 20 and 21). This makes it possible for the cameraman to freely set the offset without applying undue load to the driving mechanism (pan motor, tilt motor and gear) of the viewfinder VF.

According to the present embodiment 6, using the same target such as wear or button of a particular color on a cameraman offers an advantage of being able to carry out accurate tracking of the target without restoring the target even if a cameraman changes. Furthermore, wearing a luminous object of a particular color on the wear as a target enables the automatic tracking in the dark. In particular, in dark environments such as in a theater, using as a target a weakly luminous object attached to the cameraman's chest or hat is effective.

Embodiment 7

The embodiment 7 is designed such that the cameraman can return the viewfinder VF to its original preset position by one-touch operation independently of its current position. The preset position here refers to the following: (1) a state in which the viewfinder VF faces the direction the cameraman desires; or (2) a normal state of the viewfinder VF (that is, the face of the viewfinder VF is perpendicular to the optical axis of the television camera CA, and is rear-facing at the back of the lens LE, which is also referred to as "front position").

Because a pan position preset section of the viewfinder VF is similar to a tilt position preset section, only the tilt position preset section will be described here.

The tilt position of the viewfinder VF is detected by a tilt position sensor POS as shown in FIG. 20. The tilt position sensor POS consists of a potentiometer including a slider terminal (not shown in the figure) moving on a resistor with the rotation of its rotation axis SHF4.

Figure 22:
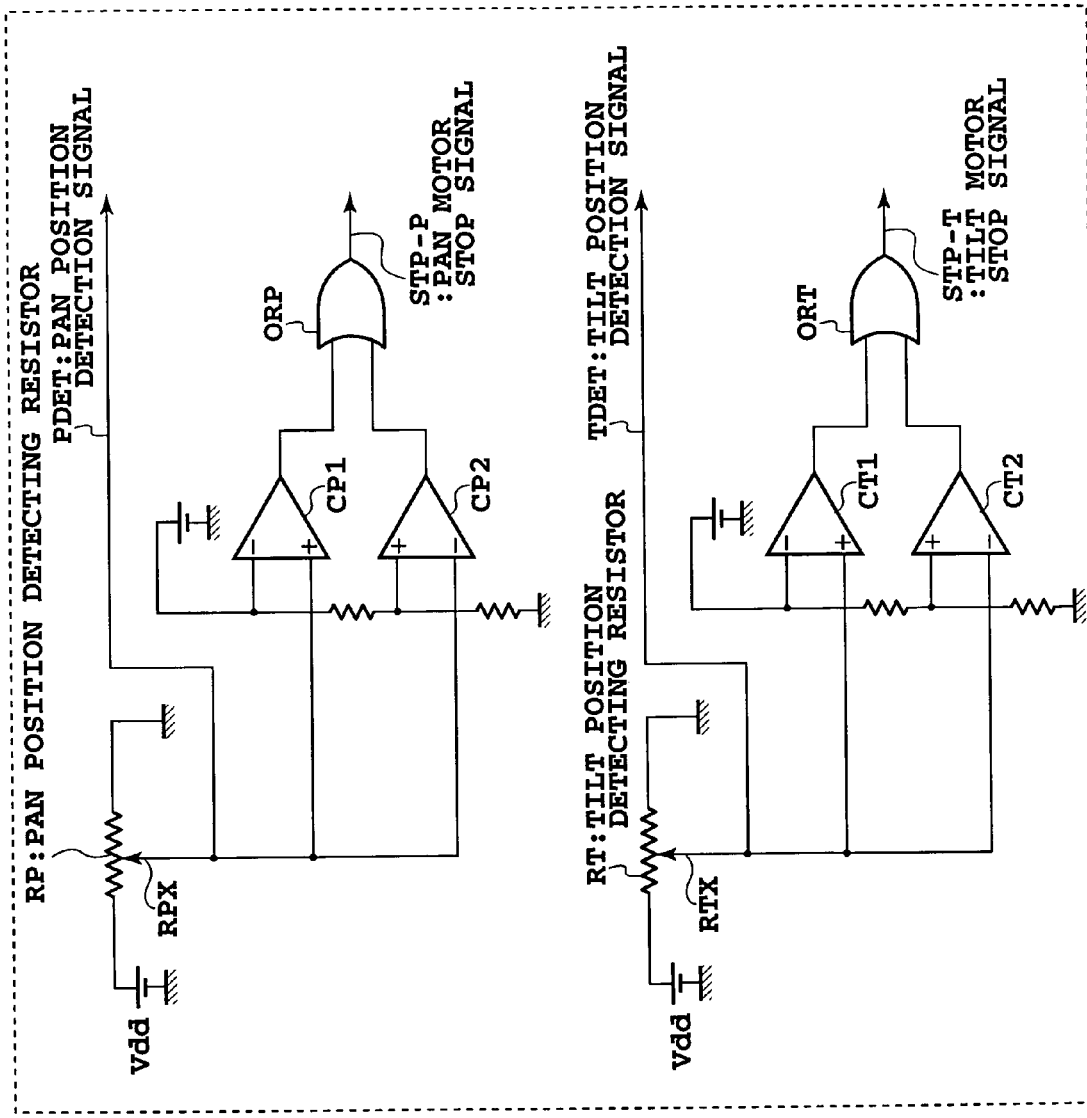
FIG. 22 is a circuit diagram showing a part of an embodiment 7 in accordance with the present invention.

A tilt position detecting resistor RT as shown in FIG. 22 is an electrical equivalent of the tilt position sensor POS as shown in FIG. 20. The sliding terminal RTX attached to the shaft of the tilt position detecting resistor RT moves in accordance with the tilt operation of the viewfinder VF, thereby outputting a tilt position detection signal TDET.

Two comparators CT1 and CT2 connected to the sliding terminal RTX detect the arrival of the sliding terminal RTX at limit positions (that is, the left and right ends of the tilt position detecting resistor RT), and output a tilt motor stop signal STP-T.

Likewise, the pan position drive section of the viewfinder VF outputs a pan position detection signal PDET and a pan motor stop signal STP-P.

Figure 23:
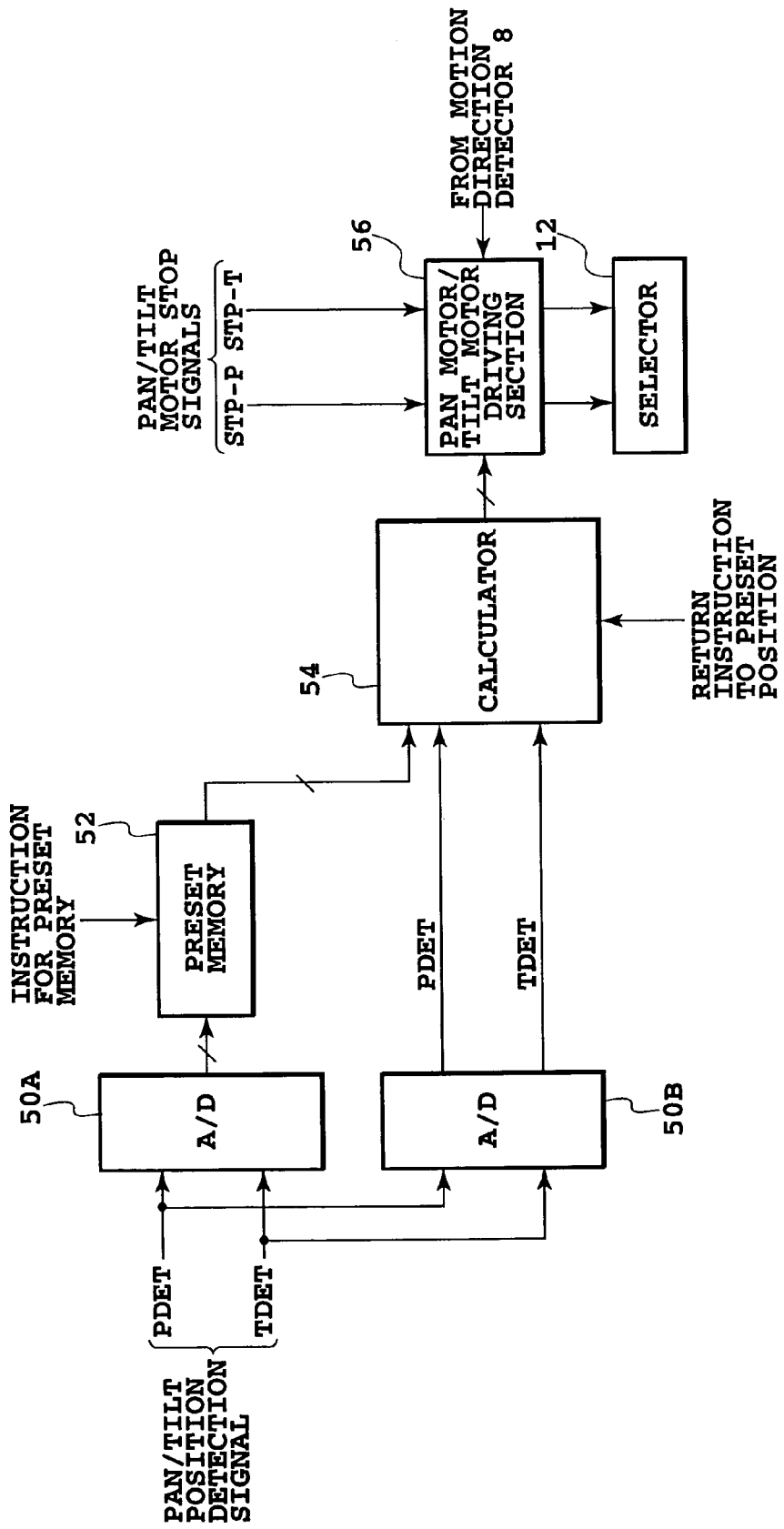
FIG. 23 is a block diagram showing a preset section in the embodiment 7.

FIG. 23 shows a configuration for storing the preset position of the viewfinder VF using the pan position detection signal PDET and tilt position detection signal TDET as shown in FIG. 22. In this figure, reference numerals 50A and 50B designate A/D converters for converting analog resistances represented by the pan and tilt position detection signals PDET and TDET into digital signals. The reference numeral 52 designates a preset memory for storing the pan-preset position and tilt-preset position. Fixing the viewfinder VF at any desired position, followed by depressing the preset switch enables the preset memory 52 to store the values of the pan position detection signal PDET and tilt position detection signal TDET at that position.

The reference numeral 54 designates a calculator for calculating differences between the pan-preset position and tilt-preset position read from the preset memory 52 and the pan position and tilt position output from the A/D converter 50B, respectively, and for supplying the difference signals to the pan motor/tilt motor drive section 56. In this case, the motor control is halted when the value of each difference signal drops below a predetermined value to prevent hunting in an error tolerance range.

The pan motor/tilt motor drive section 56 has the same function as the motor driver 10 as shown in FIGS. 3 and 8. Thus, the pan motor/tilt motor drive section 56 is supplied with the output signals from the motion direction detector 8 (see, FIGS. 3 and 8). In addition, the pan motor/tilt motor drive section 56 supplies the selector 12 (see, FIGS. 3 and 8) with the control signal. Since the operation in connection with this is described before, the description thereof is omitted here.

Since the tilt position detection signal TDET takes a value Vdd/2 when the face of the viewfinder VF is perpendicular to the image pick-up direction of the camera CA, holding the signal in the preset memory 52 as a signal representing the preset position enables the viewfinder VF to be returned to the "front position" by one-touch operation.

Furthermore, turning off the automatic tracking function makes it possible for an attached remote controller to carry out pan and tilt for any desired direction.

Embodiment 8

Figure 24:
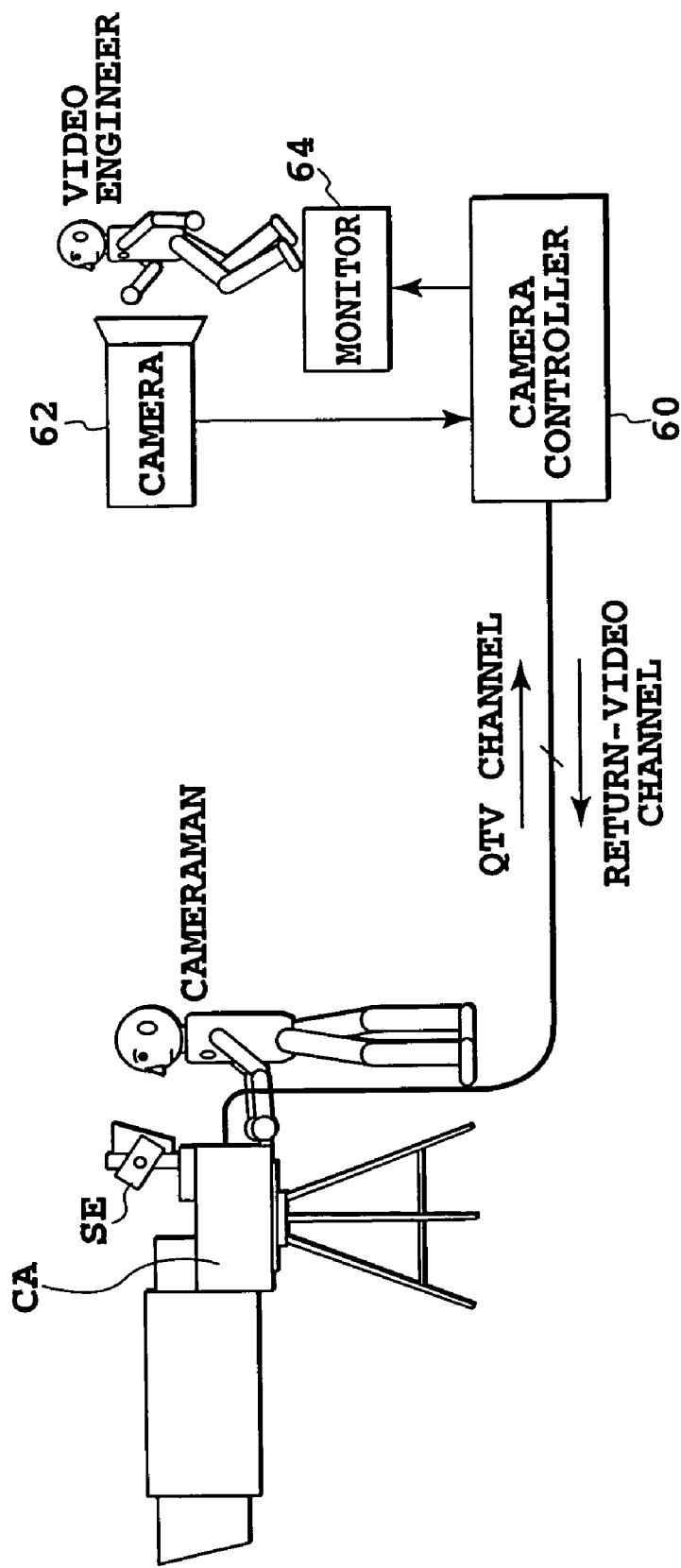
FIG. 24 is a diagram illustrating an operation in an embodiment 8 in accordance with the present invention.

According to the present embodiment 8, "income with video information" usable with a videophone touch can be implemented by utilizing images acquired by the sensor (miniature camera) SE that is trained on a cameraman as shown in FIG. 24.

Generally, a broadcast use large scale television camera comprises a camera body CA and a camera controller 60 which are separated apart from 100 m to 1 km and are interconnected by a camera cable. The cameraman and a video engineer at the camera controller 60 can communicate through a voice channel. However, as for the video channel from the camera CA to the camera controller 60, only a minimum required channel is provided without a videophone channel.

In view of this, the present embodiment 8 constructs a videophone system by utilizing a video channel (QTV channel) from the camera CA to the camera controller 60 and a video channel (RETURN VIDEO channel) from the camera controller 60 to the camera CA, which are installed in the existing camera system. The RETURN VIDEO channel is used for transmitting, when operating a plurality of cameras, information on the video condition of a camera to another camera via the camera controller 60.

Figure 25:
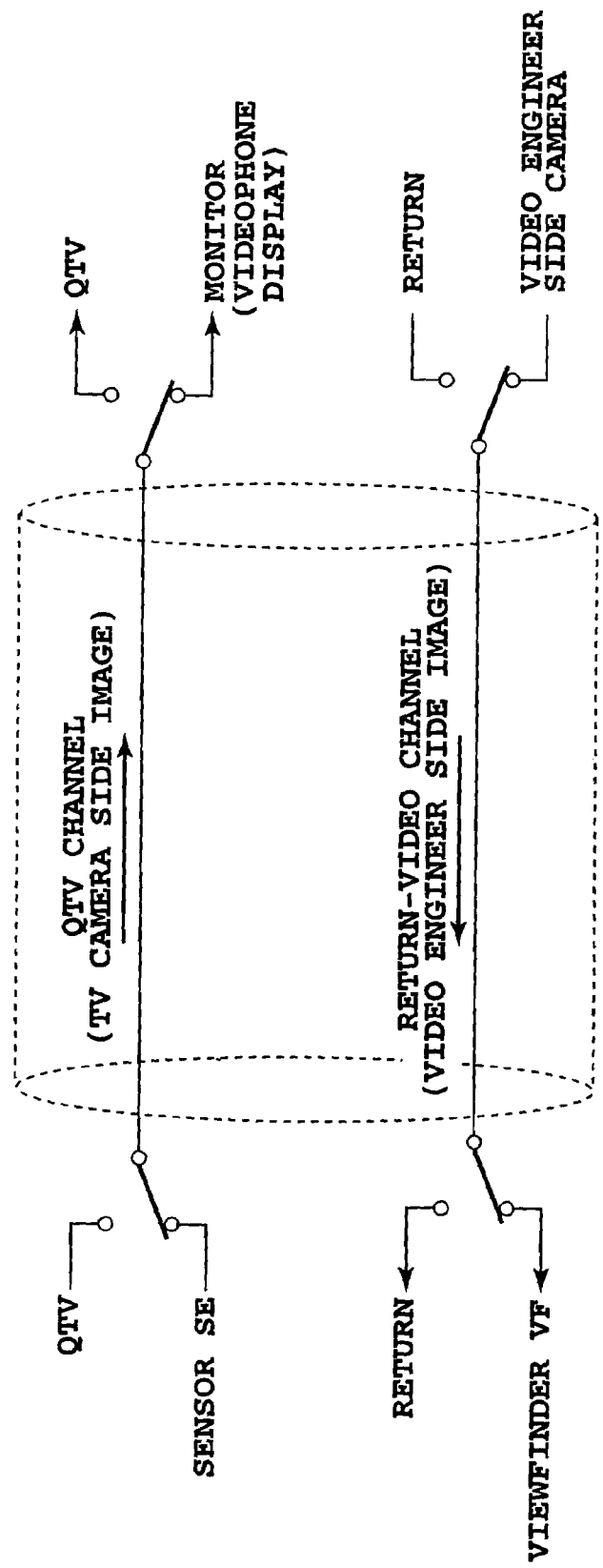
FIG. 25 is another diagram illustrating the operation in the embodiment 8.

In the present embodiment 8, switch transfer as shown in FIG. 25 is made to switch to the videophone.

Incidentally, a camera 62 on the video engineer side is not always necessary. This is because the cameraman can transfer, independently of on-air TV images, the images and voices around the camera CA to the video engineer by collecting them with turning the sensor SE in a desired direction. This greatly serves for the video engineer to learn conditions around the TV camera CA. In particular, the present embodiment 8 is very effective in such a case as shooting images for live broadcasting because the video output from the sensor SE can be used for the communication between the cameraman and the video engineer independently of the on-air images.

As described above, according to the present invention, the viewfinder and television camera can be implemented that can always train the image monitor on the face of a camera operator in response to the panning and tilting of the television camera. In particular, because the liquid crystal display used as an image monitor cannot fully meet the requirement as the viewfinder when its liquid crystal screen is seen from an angle deviated from the normal angle because of the degradation in resolution, brightness and saturation, the viewfinder that automatically tracks the face of the camera operator offers a distinct advantage. In particular, since the viewfinder automatically tracks the face of the cameraman even when the height of the television camera is changed by manipulating the dolly, the adjustment of the direction of the viewfinder becomes unnecessary. Moreover, because it can perform the automatic tracking with a simple configuration, the present invention can provide an apparatus that cannot be conceived from conventional techniques in the cost and tracking function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A television camera viewfinder system comprising:
    a viewfinder operative to display an image of the field of view of a television camera to which it is attached;
    a mounting mechanism for movably supporting the viewfinder; and
    a viewfinder control system, said control system comprising:
        an image pickup device adapted to generate an output representative of an image of the face of a television camera operator; and
        a controller responsive the output signal from said image pickup device to operate said viewfinder mounting mechanism to maintain said viewfinder substantially on axis with the line of sight of the television camera operator.

2. The viewfinder system as claimed in claim 1, wherein said image pickup device is a miniature camera attached to said viewfinder.

3. The viewfinder system as claimed in claim 2, wherein said controller includes a circuit responsive to a flesh color portion on the face of the television camera operator in the image output from said image pickup device.

4. The viewfinder system as claimed in claim 1, wherein said viewfinder comprises a liquid crystal display.

5. The viewfinder system as claimed in claim 2, wherein said miniature camera is rotatably attached to said viewfinder to make panning and/or tilting possible for capturing an accessory worn on the television camera operator.

6. The viewfinder system as claimed in claim 5, wherein the accessory to be captured by said miniature camera comprises a weakly luminous object own on the television camera operator.

7. The viewfinder system as claimed in claim 1, further comprising:
    a memory for storing information on a preset position of said viewfinder; and
    a preset control circuit operative to return said viewfinder to the preset position in accordance with the information on the preset position stored in said memory.

8. A television camera including the viewfinder system as claimed in claim 1, whereby the viewfinder is always trained on the face of the television camera operator independently of panning and/or tilting of said television camera.

9. A viewfinder system attached to a television camera, said viewfinder system comprising:
    a viewfinder which displays an image of the field of view of the television camera;
    an image pickup device operative to generate an output representative of the face of a television camera operator;
    a calculation circuit operative to calculate a central position of the face of the television camera operator in response to said face image output of said image pickup device; and
    a control circuit operative to drive a motor for panning and or tilting said viewfinder in response to the central position calculated.

10. The viewfinder system as claimed in claim 9, wherein said image pickup device is a miniature camera attached to said viewfinder, and further including an image processing device which is operative to detect the face of the television camera operator from an image output of said miniature camera.

11. The viewfinder system as claimed in claim 10, wherein said miniature camera is rotatably attached to said viewfinder to make panning and/or tiling possible for capturing an accessory worn on the television camera operator.

12. The viewfinder system as claimed in claim 11, wherein the accessory to be captured by said miniature camera comprises a weakly luminous object worn on the television camera operator.

13. The viewfinder system as claimed in claim 9, wherein said viewfinder comprises liquid crystal display.

14. The viewfinder system as claimed in claim 9, further comprising:
    a memory operative to store information on a preset position of said viewfinder; and
    a preset control circuit operative to return said viewfinder to the present position in accordance with the information on the preset position stored in said memory.

15. A television camera including the viewfinder system as claimed in claim 9, such that the viewfinder is always trained on the face of the television camera operator independently of panning and/or tilting of said television camera.

* * * * *